(12) United States Patent
Park et al.

(10) Patent No.: US 12,043,740 B2
(45) Date of Patent: Jul. 23, 2024

(54) LIGHT TRANSMITTANCE CONTROL FILM AND COMPOSITION FOR THE LIGHT TRANSMITTANCE CONTROL FILM

(71) Applicant: ELECTRONICS AND TELECOMMUNICATIONS RESEARCH INSTITUTE, Daejeon (KR)

(72) Inventors: Seung Koo Park, Sejong (KR); Sung Ryul Yun, Daejeon (KR); Ki Uk Kyung, Daejeon (KR); Mi Jeong Choi, Daejeon (KR); Bong Je Park, Daejeon (KR); Suntak Park, Daejeon (KR); Saekwang Nam, Daejeon (KR); Seongcheol Mun, Daejeon (KR); Eun Jin Shin, Daejeon (KR); Jeong Mook Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 200 days.

(21) Appl. No.: 17/324,869

(22) Filed: May 19, 2021

(65) Prior Publication Data

US 2021/0292495 A1 Sep. 23, 2021

Related U.S. Application Data

(63) Continuation of application No. 16/306,866, filed as application No. PCT/KR2018/004576 on Apr. 19, 2018, now Pat. No. 11,041,055.

(30) Foreign Application Priority Data

Apr. 20, 2017 (KR) ........................ 10-2017-0051197
Jan. 8, 2018 (KR) ........................ 10-2018-0002435

(51) Int. Cl.
| | | |
|---|---|---|
| C08L 83/10 | (2006.01) | |
| C08F 220/14 | (2006.01) | |
| C08F 283/12 | (2006.01) | |
| C08G 77/20 | (2006.01) | |
| C08G 77/442 | (2006.01) | |
| C08J 5/18 | (2006.01) | |
| G02B 26/02 | (2006.01) | |
| G02B 1/04 | (2006.01) | |

(52) U.S. Cl.
CPC ............ *C08L 83/10* (2013.01); *C08F 220/14* (2013.01); *C08F 283/12* (2013.01); *C08G 77/20* (2013.01); *C08G 77/442* (2013.01); *C08J 5/18* (2013.01); *G02B 26/023* (2013.01); *C08J 2383/10* (2013.01); *C08L 2203/16* (2013.01); *G02B 1/04* (2013.01)

(58) Field of Classification Search
CPC ........................... C08F 283/12; C08G 77/442
See application file for complete search history.

(56) References Cited

U.S. PATENT DOCUMENTS

| | | | |
|---|---|---|---|
| 3,923,923 A * | 12/1975 | Fiedler | C08F 283/124 |
| | | | 525/450 |
| 6,248,263 B1 | 6/2001 | Tonar et al. | |
| 6,461,541 B1 | 10/2002 | Lee et al. | |
| 9,029,481 B2 | 5/2015 | Nemoto et al. | |
| 2003/0175004 A1 | 9/2003 | Garito et al. | |
| 2009/0029149 A1 | 1/2009 | Kim et al. | |
| 2013/0317175 A1 | 11/2013 | Guo et al. | |
| 2014/0092464 A1 | 4/2014 | Arsenault et al. | |
| 2014/0227210 A1 | 8/2014 | Farcet | |
| 2016/0159686 A1 | 6/2016 | Park et al. | |

FOREIGN PATENT DOCUMENTS

| | | |
|---|---|---|
| EP | 565093 A1 * | 10/1993 |
| JP | H7-81214 A | 3/1995 |
| JP | 10-130478 * | 5/1998 |
| JP | 2005-529984 A | 10/2005 |
| JP | 2006028202 | 2/2006 |
| JP | 2013-246445 A | 12/2013 |
| JP | 5827101 B2 | 12/2015 |
| KR | 100332459 | 4/2002 |
| KR | 20050012076 | 1/2005 |
| KR | 20130080992 | 7/2013 |
| KR | 20140043458 | 4/2014 |
| KR | 20160107706 | 9/2016 |
| KR | 101860671 B1 * | 5/2018 |
| WO | 2011/093330 A1 | 8/2011 |

(Continued)

OTHER PUBLICATIONS

Machine translation of KR 101860671 (no date).*

(Continued)

*Primary Examiner* — Marc S Zimmer

(57) ABSTRACT

Provided are a composition for a light transmittance control film, and a light transmittance control film. According to the inventive concept, the light transmittance control film includes a matrix part including a copolymer and a polymer chain which is grafted to the copolymer, and a dispersed part including a polymer derived from a first monomer, and are provided in the matrix part, wherein the polymer chain is derived from the first monomer, first light transmittance is shown while external force is applied, and second light transmittance which is greater than the first light transmittance may be shown after the external force is removed.

11 Claims, 11 Drawing Sheets

(56) References Cited

FOREIGN PATENT DOCUMENTS

| WO | WO2012079152 A1 | 6/2012 |
| WO | 2013/108629 A1 | 7/2013 |
| WO | WO2017019179 A1 | 2/2017 |

OTHER PUBLICATIONS

Machine translation of JP 10-130478 (no date).*
Higgins, "Probing the Mesoscopic Chemical and Physical Properties of Polymer-Dispersed Liquid Crystals," Advanced Materials, 2000, vol. 12 (4), pp. 251-264.
Mucha, "Polymer as an Important Component of Blends and Composites with Liquid Crystals," Progress in Polymer Science, 2003, vol. 28 (5), pp. 837-873.
Search Report dated Jul. 24, 2018 for PCT Application No. PCT/KR2018/004576.

* cited by examiner

LIGHT TRANSMITTANCE CONTROL FILM AND COMPOSITION FOR THE LIGHT TRANSMITTANCE CONTROL FILM

CROSS-REFERENCE TO RELATED APPLICATIONS

This U.S. non-provisional patent application is a continuation of U.S. application Ser. No. 16/306,866, filed Dec. 3, 2018, which is a U.S. National Phase of International Application No. PCT/KR2018/004576, filed Apr. 19, 2018, which claims priority under 35 U.S.C. § 119 of Korean Patent Application Nos. 10-2017-0051197, filed on Apr. 20, 2017 and 10-2018-0002435, filed on Jan. 8, 2018, the entire contents of which are hereby incorporated by reference.

TECHNICAL FIELD

The present invention disclosed herein relates to a light transmittance control film and a composition for the light transmittance control film.

BACKGROUND ART

The present invention discloses a light transmission control film not containing any liquid crystal or electrochromic molecules, which improves the defects of a film type light transmission control module based on liquid crystal and electrochromic molecules.

A method for controlling light intensity using low molecular weight liquid crystals (LCs) uses polarized light based on operation principle, and thus has drawbacks of the increase in power consumption due to light loss and the use of components such as a polarizing plate and an expensive liquid crystal material. A method for controlling light intensity using polymer-dispersed liquid crystals (PDLCs) has a drawback of low shielding ratio of light because of light scattering under no electric field. A light absorption control method via the oxidation and reduction of an electrochromic material and the alignment of a dichromic dye and a particle which is dispersed and suspended, respectively, in a polymer has drawbacks of high manufacturing cost from the materials and packaging and low transmittance change of about 30-50% due to the limitation of light control mechanism.

DISCLOSURE OF THE INVENTION

Technical Problem

The present invention is to provide a film which may simply control light transmittance without an electrical filed, and a composition for a light transmittance control film for preparing the same.

The present invention is not limited to the above-mentioned task, and unmentioned tasks will be apparently understood by the description below for a person skilled in the art.

Technical Solution

The present invention relates to a light transmittance control film and a composition for the light transmittance control film. According to the present invention, a light transmittance control film includes a matrix part including a copolymer and a polymer chain which is combined with the copolymer; and a dispersed part including a polymer derived from a first monomer, which is provided in the matrix part, wherein the polymer chain may be derived from the first monomer. First light transmittance may be shown while external force is applied, and second light transmittance which is greater than the first light transmittance may be shown after the external force is removed.

In some embodiments, the second light transmittance may be about 35% to about 95% with respect to visible light.

In some embodiments, numerous voids may be provided between the dispersed part and the matrix part while the external force is applied, and the voids may be disappeared after the external force is removed.

In some embodiments, the dispersed part may have a greater initial modulus than the matrix part.

In some embodiments, the dispersed part may have about 100 to about 100,000 times as much initial modulus as the matrix part has.

In some embodiments, a difference between a refractive index of the matrix part and a refractive index of the dispersed part may be less than about 5%.

In some embodiments, the external force may include tensile force.

In some embodiments, the first monomer may be represented by the following Formula 1:

[Formula 1]

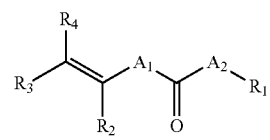

In Formula 1, A1 and A2 are each independently a single bond, oxygen (O), —NH—, or sulfur (S), R1 is hydrogen, halogen, linear or branched alkyl group of 1 to 8 carbon atoms, or halogen-substituted linear or branched alkyl group of 1 to 8 carbon atoms, and R2, R3, and R4 are each independently hydrogen, halogen, or linear or branched alkyl group of 1 to 5 carbon atoms.

In some embodiments, the matrix part may be represented by the following Formula 6A:

[Formula 6A]

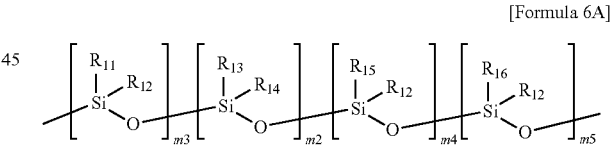

In Formula 6A, R11 is represented by the following Formula 2B, R12, R13, and R14 are each independently hydrogen, halogen, linear or branched alkyl group of 1 to 5 carbon atoms, or substituted or unsubstituted phenyl group of 6 to 13 carbon atoms, R15 may include at least one of the materials represented by the following Formula 6B, and R16 may include at least one material represented by the following Formula 6C:

[Formula 2B]

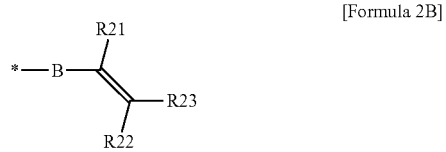

In Formula 2B, * means a bonded part of Formula 6A to Si, B is a single bond, or linear or branched alkyl group of 1 to 5 carbon atoms, carbonyl, ester, acetate, amide, or —S—CO— group, and R21, R22, and R23 are each independently hydrogen, halogen, or linear or branched alkyl group of 1 to 5 carbon atoms:

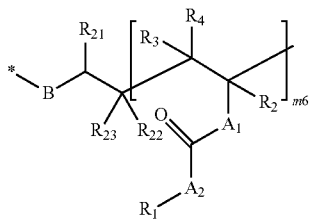

[Formula 6B]

In Formula 6B, * means a part bonded to Si in Formula 6A, A1 and A2 are each independently a single bond, oxygen (O), —NH—, or sulfur (S), B is a single bond, linear or branched alkyl group of 1 to 5 carbon atoms, carbonyl, ester, acetate, amide, or —S—CO— group, R1 is hydrogen, halogen, linear or branched alkyl group of 1 to 8 carbon atoms, or halogen-substituted linear or branched alkyl group of 1 to 8 carbon atoms, R2, R3, and R4 are each independently hydrogen, halogen, or linear or branched alkyl group of 1 to 5 carbon atoms, R21, R22, and R23 are each independently hydrogen, halogen, linear or branched alkyl group of 1 to 5 carbon atoms, or substituted or unsubstituted phenyl group of 6 to 13 carbon atoms, and m6 is an integer selected from 1 to 100:

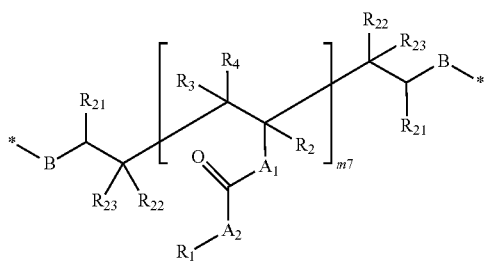

[Formula 6C]

In Formula 6C, * means a part bonded to Si in Formula 6A, A1 and A2 are each independently a single bond, oxygen (O), —NH—, or sulfur (S), B is a single bond, linear or branched alkyl group of 1 to 5 carbon atoms, carbonyl, ester, acetate, amide, or —S—CO— group, R1 is hydrogen, halogen, linear or branched alkyl group of 1 to 8 carbon atoms, or halogen-substituted linear or branched alkyl group of 1 to 8 carbon atoms, R2, R3, and R4 are each independently hydrogen, halogen, or linear or branched alkyl group of 1 to 5 carbon atoms, R21, R22, and R23 are each independently hydrogen, halogen, linear or branched alkyl group of 1 to 5 carbon atoms, or substituted or unsubstituted phenyl group of 6 to 13 carbon atoms, and m7 is an integer selected from 1 to 100.

According to the present invention, a composition for a light transmittance control film includes a first monomer; and a copolymer including a first polymer derived from a second monomer and a second polymer derived from a third monomer, wherein a molar ratio of the first polymer in the copolymer and the first monomer is from about 1:5 to about 1:100, and a molar ratio of the first polymer and the second polymer in the copolymer is from about 1:4 to about 1:200.

In some embodiments, the first monomer may be represented by the following Formula 1:

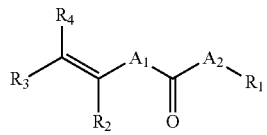

[Formula 1]

In Formula 1, A1 and A2 are each independently a single bond, oxygen (O), —NH—, or sulfur (S), R1 is hydrogen, halogen, linear or branched alkyl group of 1 to 8 carbon atoms, or halogen-substituted linear or branched alkyl group of 1 to 8 carbon atoms, and R2, R3, and R4 are each independently hydrogen, halogen, or linear or branched alkyl group of 1 to 5 carbon atoms.

In some embodiments, the first polymer may include a polymerization unit represented by the following Formula 2A:

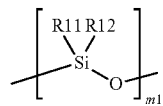

[Formula 2A]

In Formula 2A, R11 is represented by the following Formula 2B, R12 is hydrogen, halogen, linear or branched alkyl group of 1 to 5 carbon atoms, or substituted or unsubstituted phenyl group of 6 to 13 carbon atoms, and m1 is an integer between 2 and 50:

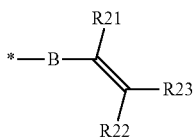

[Formula 2B]

In Formula 2B, B is a single bond, or linear or branched alkyl group of 1 to 5 carbon atoms, carbonyl, ester, acetate, amide, or —S—CO— group, and R21, R22, and R23 are each independently hydrogen, halogen, or linear or branched alkyl group of 1 to 5 carbon atoms.

In some embodiments, the second polymer may include a polymerization unit represented by the following Formula 3:

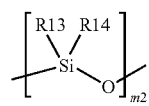

[Formula 3]

In Formula 3, R13 and R14 are each independently hydrogen, halogen, linear or branched alkyl group of 1 to 5 carbon atoms, or substituted or unsubstituted phenyl group of 6 to 13 carbon atoms, and m2 is an integer between 10 and 10,000.

In some embodiments, the first monomer may include t-butyl acrylate, the copolymer may include a silicon copolymer represented by the following Formula 4B, where the silicon copolymer may have a weight average molecular weight of about 5,000 to about 500,000, and the silicon copolymer may be dissolved in the t-butyl acrylate monomer:

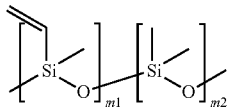

[Formula 4B]

In Formula 4B, a ratio of m1 and m2 is from about 1:4 to about 1:200.

In some embodiments, a molar ratio of the t-butyl acrylate monomer with respect to a total molar ratio of a vinyl group included in the copolymer may be from about 1:5 to about 1:100.

In some embodiments, a polymerization initiator may be further included.

In some embodiments, at least one of the first monomer and the copolymer may include a vinyl group, and the polymerization initiator may be about 0.05-5 mol % based on the total of the vinyl group.

Advantageous Effects

According to the present invention, the light transmittance of the invented film may be controlled by the intensity of the applied external force. The film is transparent before applying the external force. The transmittance of the light transmittance control film may decrease due to a stress-whitening phenomenon. The light transmittance control film may have excellent elasticity recovery properties. After the external force is removed, the light transmittance control film may return to the initial state before applying the external force. Accordingly, light transmittance may be easily controlled. The light transmittance control film may be simply manufactured by the photopolymerization reaction of a composition for a light transmittance control film.

BRIEF DESCRIPTION OF THE DRAWINGS

The accompanying drawings are included to provide a further complete understanding of the present invention, and reference numbers are shown below.

MODE FOR CARRYING OUT THE INVENTION

Figure 1:
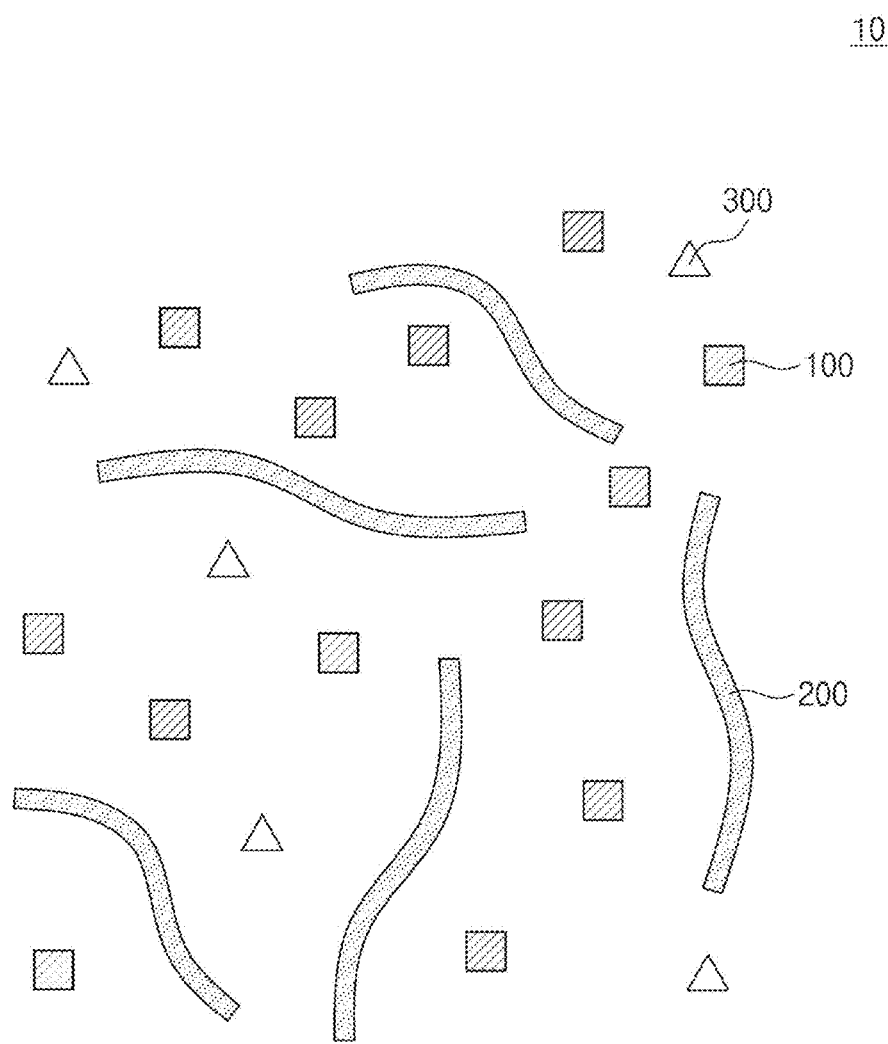
FIG. 1 is a schematic diagram showing a molecular composition for a light transmittance control film according to embodiments of the present invention.

In order to sufficiently understand the configuration and effect of the present invention, preferred embodiments of the present invention will be described with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. A person skilled in the art could understand that what circumstance is appropriate for conducting the concept of the present invention.

The terminology used herein is for the purpose of describing example embodiments and is not intended to limit the present inventive concept. As used herein, the singular forms are intended to include the plural forms as well, unless the context clearly indicates otherwise. It will be further understood that the terms "comprises" and/or "comprising," when used in this disclosure, specify the presence of stated features, steps, operations, and/or devices, but do not preclude the presence or addition of one or more other features, steps, operations, and/or devices thereof.

It will also be understood that when a layer (or film) is referred to as being on another layer (or film) or substrate, it can be directly on the other layer (or film) or substrate, or a third intervening layer (or film) may also be present.

It will be understood that, although the terms first, second, third etc. may be used herein to describe various regions, layers (or films), etc. these regions and layers should not be limited by these terms. These terms are only used to distinguish one region or layer (or film) from another region or layer (film). Thus, a first layer discussed below could be termed a second layer. Example embodiments embodied and described herein may include complementary example embodiments thereof. Like reference numerals refer to like elements throughout.

The terminology used in exemplary embodiments of the present invention may be interpreted as a meaning commonly known to a person skilled in the art, unless otherwise defined.

A film composition according to the present invention will be explained.

FIG. 1 is a schematic diagram showing a molecular composition for a light transmittance control film according to embodiments of the present invention.

Referring to FIG. 1, a composition (10) for a light transmittance control film may include a first monomer (100) and a copolymer (200). The first monomer (100) may be represented by Formula 1 below.

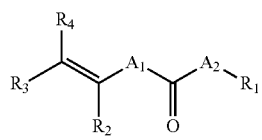

[Formula 1]

In Formula 1, A1 and A2 may be each independently a single bond, oxygen (O), —NH—, or sulfur (S), R1 may be hydrogen, halogen, linear or branched alkyl group of 1 to 8 carbon atoms, or halogen-substituted linear or branched alkyl group of 1 to 8 carbon atoms, and R2, R3, and R4 may be each independently hydrogen, halogen, or linear or branched alkyl group of 1 to 5 carbon atoms.

According to an embodiment, the first monomer (100) may include an acryl-based monomer or a vinyl-based monomer. The first monomer (100) may include, for example, at least one selected from styrene, 2,3,4,5,6-pentafluorostyrene, methylacrylate, methylmethacrylate, ethylacrylate, ethylmethacrylate, butylacrylate, butylmethacrylate, t-butylacrylate, t-butylmethacrylate, hexylacrylate, hexylmethacrylate, octylacrylate, octylmethacrylate, octadecylacrylate, octadecylmethacrylate, dodecylacrylate, dodecylmethacrylate, vinyl acetate, trifluoroacetic acid allyl ester, trifluoroacetic acid vinyl ester, 2,2,2-trifluoroethyl methacrylate, acrylic acid 1,1,1,3,3,3-hexafluoroisopropyl ester, methacrylic acid 1,1,1,3,3,3-hexafluoroisopropyl ester, and 1-pentafluorophenylpyrrole-2,5-dione.

The copolymer (200) may include a first polymer and a second polymer. The weight average molecular weight of the copolymer (200) may be from about 5,000 to about 500,000. The first polymer may include a polymerization unit derived from a second monomer. The first polymer may include a polymerization unit represented by Formula 2A below.

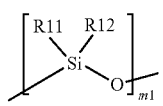

[Formula 2A]

In Formula 2A, R11 may be represented by Formula 2B below. R12 may be hydrogen, halogen, linear or branched alkyl group of 1 to 5 carbon atoms, or substituted or unsubstituted phenyl group of 6 to 13 carbon atoms, and m1 may be an integer between 2 and 50.

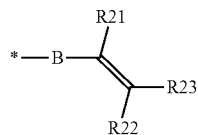

[Formula 2B]

In Formula 2B, B may be a single bond, or linear or branched alkyl group of 1 to 5 carbon atoms, carbonyl, ester, acetate, amide, or —S—CO— group, and R21, R22, and R23 may be each independently hydrogen, halogen, or linear or branched alkyl group of 1 to 5 carbon atoms.

The first polymer may include a reactive group. The reactive group may be a group represented by Formula 2B.

A second polymer may be combined with the first polymer. The second polymer may include a polymerization unit represented by Formula 3 below. The second polymer may be derived from a third monomer. The third monomer may be different from the first monomer (100) and the second monomer.

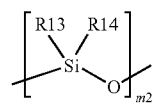

[Formula 3]

In Formula 3, R13 and R14 may be each independently hydrogen, halogen, linear or branched alkyl group of 1 to 5 carbon atoms, or substituted or unsubstituted phenyl group of 6 to 13 carbon atoms. m2 may be an integer between 10 and 10,000.

In the composition (10) for a light transmittance control film, the molar ratio of the total of the polymerization unit of the first polymer in the copolymer (200) to the first monomer (100) may be from about 1:5 to about 1:100. Here, the total of the polymerization unit of the first polymer may be, for example, the total of m1 in Formula 2A.

According to an embodiment, the copolymer (200) may be represented by the following Formula 4A:

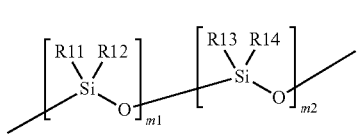

[Formula 4A]

In Formula 4A, R12, R13, and R14 may be each independently hydrogen, halogen, linear or branched alkyl group of 1 to 5 carbon atoms, or substituted or unsubstituted phenyl group of 6 to 13 carbon atoms, m1 may be an integer between 2 and 50, m2 may be an integer between 10 and 10,000, and m1:m2 may be from about 1:4 to about 1:200. R11 may be represented by Formula 2B.

The copolymer (200) may be prepared by the polymerization reaction of a second monomer and a third monomer as Reaction 1 below.

[Reaction 1]

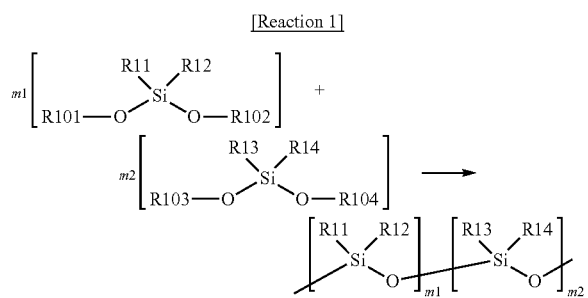

In Reaction 1, R11, R12, R13, R14, m1, and m2 are the same as defined in Formula 2A, Formula 2B, and Formula 4A.

The composition (10) for a light transmittance control film may further include a polymerization initiator (300). The polymerization initiator (300) may include a photopolymerization initiator. The polymerization initiator (300) may include, for example, 2,2-dimethoxy-2-phenylacetophenone. In another embodiment, the polymerization initiator (300) may include a thermal polymerization initiator.

According to an embodiment, the first monomer (100) may include t-butyl acrylate, the copolymer (200) may include a silicon copolymer represented by Formula 4B below, and the silicon copolymer may have a weight average molecular weight of about 5,000 to about 500,000. The silicon copolymer may be dissolved in t-butyl acrylate.

[Formula 4B]

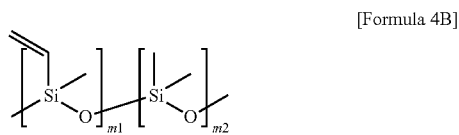

In Formula 4B, the ratio of m1 and m2 is from about 1:4 to about 1:200.

The molar ratio of the t-butyl acrylate with respect to the total molar ratio of the vinyl group included in the copolymer (200) may be from about 1:5 to about 1:100. At least one of the first monomer (100) and the copolymer (200) may include a vinyl group. If the composition (10) for a light transmittance control film further includes the polymerization initiator (300), the polymerization initiator (300) may be from about 0.05 mol % to about 5 mol % with respect to the total of the vinyl group.

Generally, in a semicrystalline polymer such as polyethylene, polypropylene, polyoxymethylene, polyethyleneterephthalate, and polyamide, it is known that voids with a size of several nanometers are formed in the process of growing a noncrystalline region from lamellae crystals by extension, and the voids are grown to a size of several tens or several hundreds nanometers, which may arise light scattering by extension near break, thereby showing stress-whitening by stress at break. The stress-whitening is not shown by compression or torsional stress. Alternatively, irrespective of the crystallinity of a polymer, if a composite film in which a binary polymer or inorganic materials are dispersed in a polymer matrix is extended, voids may be formed at the interface between a polymer and a dispersant due to the difference of tensile strain (E) between a polymer matrix and a dispersant, and such voids grow with continuous tension and visible light passing through a film is scattered near break, thereby arising whitening phenomenon by which the film becomes opaque. Since, however, such phenomenon is generated when the polymer film nearly breaks the control of light transmittance by the stress-whitening is irreversible with respect to the change of the tensile stress of the film. In addition, since the stress-whitening phenomenon is mainly generated in a semicrystalline polymer or a polymer composite film in which a dispersant is, the light transmittance of an initial polymer film before applying tensile stress may decrease due to the light scattering of the crystal region or the dispersant.

The light transmittance control film in the present invention uses the stress-whitening phenomenon of a polymer and is a film of which light transmittance is controlled according to the applied mechanical strain or stress.

Hereinafter, a light transmittance control film and a method of manufacturing thereof will be explained.

Figure 2:
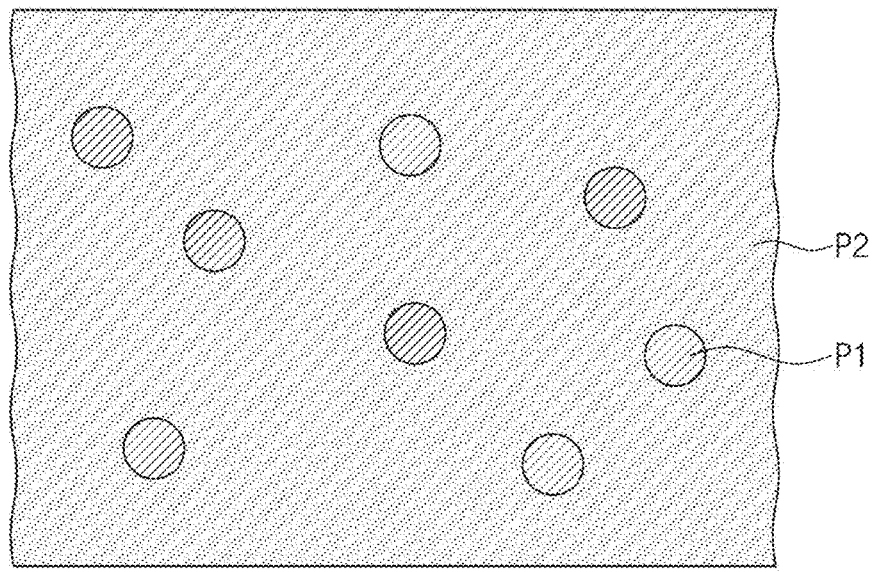
FIG. 2 is a plane view of schematic diagram showing a light transmittance control film according to embodiments.
Figure 3:
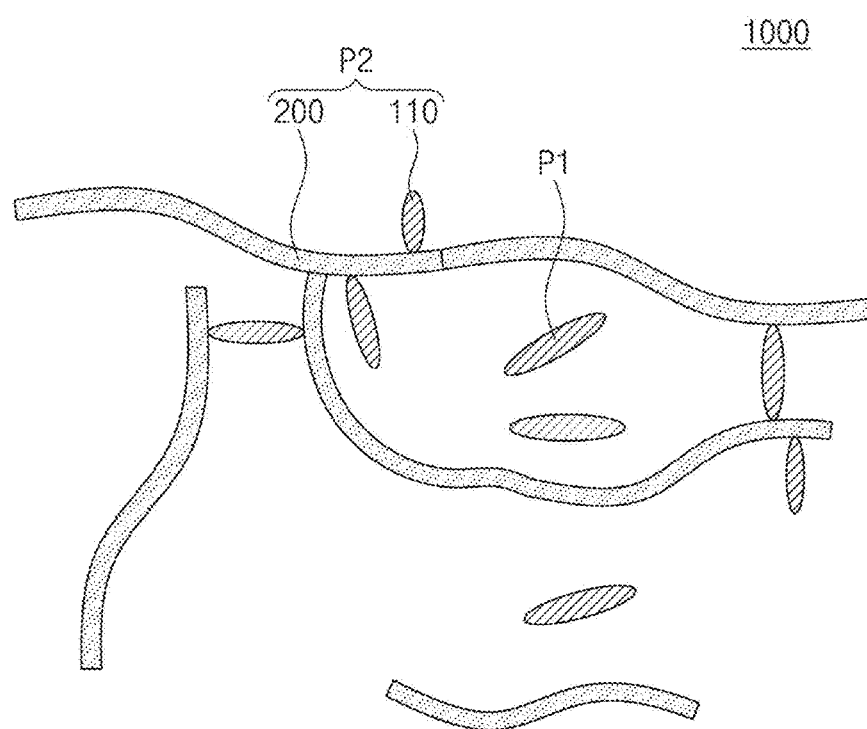
FIG. 3 schematically shows a molecular chain composition of the light transmittance control film of FIG. 2.

FIG. 2 is a plane view of schematic diagram showing a light transmittance control film according to embodiments. FIG. 3 schematically shows a molecular chain composition of the light transmittance control film of FIG. 2. Hereinafter, overlapping parts with the above description will be omitted.

Referring to FIG. 2, a light transmittance control film (1000) may include a dispersed part (P1) and a matrix part (P2). The control of light transmittance using the light transmittance control film (1000) will be explained in more detail in FIG. 5. The dispersed part (P1) may be provided in the matrix part (P2). The dispersed part (P1) may have a circular or elliptical shape. The dispersed part (P1) may have maximum diameters of about 10 nm to about 500 nm.

The matrix part (P2) may play the role of the matrix of the light transmittance control film (1000). The content and volume of the matrix part (P2) may be smaller than the content and volume of the dispersed part (P1). The matrix part (P2) may include a polymerization unit derived from a monomer different from the dispersed part (P1). The matrix part (P2) may have compatibility with the dispersed part (P1).

The light transmittance control film (1000) may have initial modulus of about 50 MPa or less. The dispersed part (P1) of the light transmittance control film (1000) may have greater initial modulus than the matrix part (P2). The initial modulus of the dispersed part (P1) may be 100 times or more, specifically, 100 times to 100000 times more than that of the matrix part (P2). The initial modulus of the matrix part (P2) may be from about 0.01 MPa to about 1 MPa, and the initial modulus of the dispersed part (P1) may be about 100 MPa or more, specifically, from about 100 MPa to about 100,000 MPa. In the disclosure, the initial modulus may mean initial modulus at room temperature, for example, about 25° C. The matrix part (P2) may have a greater strain than the dispersed part (P1) against the constant external force. The matrix part (P2) may have excellent elastic recovery properties.

The matrix part (P2) may have the same or similar refractive index as the dispersed part (P1). For example, the difference between the refractive index of the matrix part (P2) and the refractive index of the dispersed part (P1) may be less than about 5%. If the refractive index of the matrix part (P2) is excessively greater than the refractive index of the dispersed part (P1) (for example, the difference of refractive index is about 5% or more), the light transmittance of the light transmittance control film (1000) may decrease. Hereinafter, the preparation method of the dispersed part (P1) and the matrix part (P2) will be explained.

Referring to FIG. 2 and FIG. 3, the dispersed part (P1) may include homopolymers. The dispersed part (P1) may include a polymerization unit derived from the first monomer (100). The first monomer (100) may be represented by Formula 1. Accordingly, the dispersed part (P1) may include a polymer represented by the following Formula 5:

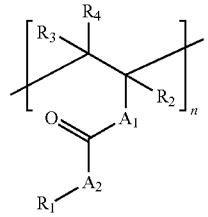

[Formula 5]

In Formula 5, A1 and A2 are each independently a single bond, oxygen (O), —NH—, or sulfur (S), R1 is hydrogen, halogen, linear or branched alkyl group of 1 to 8 carbon atoms, or halogen-substituted linear or branched alkyl group of 1 to 8 carbon atoms, and R2, R3, and R4 are each independently hydrogen, halogen, or linear or branched alkyl group of 1 to 5 carbon atoms. n is an integer between 2 and 5000.

In another embodiment, the dispersed part (P1) may include inorganic materials.

The matrix part (P2) may include a copolymer (200) and a polymer chain (110). The copolymer (200) may be random, alternative, or block types. The copolymer (200) may play the role of a main chain. The copolymer (200) may include a first polymer and a second polymer as described in FIG. 1. The second polymer may be represented by Formula 3. After curing the composition for the light transmittance control film (10) of FIG. 1, the polymer chain (110) may be formed and grafted into the copolymer (200). After curing the composition for the light transmittance control film (10), the polymer chain (110) may be bonded to the first polymer. The polymer chain (110) may include polymerization units derived from the first monomer (100). After the composition (10) for the light transmittance control film is cured, the matrix part (P2) may be represented by Formula 6A below. In this case, the matrix part (P2) may have a weight average molecular weight of about 5,000-500,000.

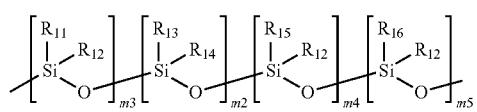

[Formula 6A]

In Formula 6A, R11 may be represented by Formula 2B, R12, R13, and R14 may be each independently hydrogen, halogen, linear or branched alkyl group of 1 to 5 carbon atoms, or substituted or unsubstituted phenyl group of 6 to 13 carbon atoms. The sum of m3, m4, and m5 may be the same as m1 of Formula 4A. R15 may be represented by Formula 6B below. R16 may be represented by Formula 6C below.

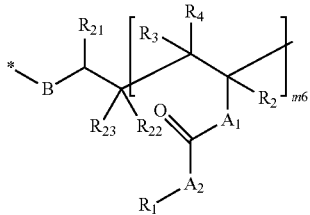

[Formula 6B]

In Formula 6B, * may mean a part bonded to Si in Formula 6A, A1 and A2 may be each independently a single bond, oxygen (O), —NH—, or sulfur (S), B may be a single bond, linear or branched alkyl group of 1 to 5 carbon atoms, carbonyl, ester, acetate, amide, or —S—CO— group, R1 may be hydrogen, halogen, linear or branched alkyl group of 1 to 8 carbon atoms, or halogen-substituted linear or branched alkyl group of 1 to 8 carbon atoms, R2, R3, and R4 may be each independently hydrogen, halogen, or linear or branched alkyl group of 1 to 5 carbon atoms, R21, R22, and R23 may be each independently hydrogen, halogen, linear or branched alkyl group of 1 to 5 carbon atoms, or substituted or unsubstituted phenyl of 6 to 13 carbon atoms. m6 may be an integer selected from 1 to 100.

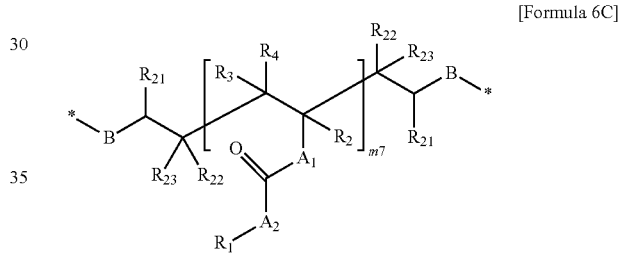

[Formula 6C]

In Formula 6C, * means a part bonded to Si in Formula 6A, A1 and A2 are each independently a single bond, oxygen (O), —NH—, or sulfur (S), B is a single bond, linear or branched alkyl group of 1 to 5 carbon atoms, carbonyl, ester, acetate, amide, or —S—CO— group, R1 is hydrogen, halogen, linear or branched alkyl group of 1 to 8 carbon atoms, or halogen-substituted linear or branched alkyl group of 1 to 8 carbon atoms, R2, R3, and R4 are each independently hydrogen, halogen, or linear or branched alkyl group of 1 to 5 carbon atoms, R21, R22, and R23 are each independently hydrogen, halogen, linear or branched alkyl group of 1 to 5 carbon atoms, or substituted or unsubstituted phenyl group of 6 to 13 carbon atoms, and m7 is an integer selected from 1 to 100.

Referring to FIG. 1 and FIG. 3, the light transmittance control film (1000) may be manufactured using the composition (10) for the light transmittance control film as explained in FIG. 1. For example, by the polymerization reaction of the composition (10) for the light transmittance control film, dispersed part (P1) and a matrix part (P2) may be formed. The polymerization reaction of the composition (10) for the light transmittance control film may be initiated by light or heat. The manufacture of the light transmittance control film (1000) may include forming the dispersed part (P1) by the polymerization reaction of the first monomer (100) and performing graft polymerization or crosslinking reaction of the first monomer (100) into the copolymer (200). The polymerization reaction of the first monomer (100) and the copolymer (200) may be performed by graft polymerization reaction. In this case, the vinyl group of the first polymer may function as a reactive group so as to be bonded to the polymer chain (110).

The composition (10) for the light transmittance control film may include a plurality of copolymers (200). During the polymerization reaction, the copolymers (200) may be directly crosslinked from each other, or connected via at least one of the polymer chains (110). Accordingly, the matrix part (P2) shown in FIG. 3 may be formed. In another embodiment, the matrix part (P2) may further include fourth polymerization units derived from the fourth monomer. In this case, the fourth monomer may be different from the first to third monomers.

The polymer chains (110) of the matrix part (P2) may be derived from the same monomer as the dispersed part (P1), for example, the first monomer (100). Accordingly, the matrix part (P2) may have compatibility with the dispersed part (P1). For example, though the copolymer (200) has lower compatibility with the dispersed part (P1), the matrix part (P2) may have excellent compatibility with the dispersed part (P1) by controlling the amount of the grafted polymer (110) in the matrix part (P2).

By controlling the molar ratio between the reactive groups of the copolymer (200) and the first monomer (100) in the composition (10) for the light transmittance control film, the amount of the grafted polymer (110) and the dispersed part (P1) of the light transmittance control film (1000) may be controlled. The reactive group of the copolymer (200) may be a reactive group included in the first polymer of the copolymer (200). Accordingly, the amount of the dispersed part (P1) in the light transmittance control film (1000) and the size of dispersed particles may be controlled. In the present disclosure, the size may mean the maximum diameter unless otherwise explained.

According to exemplary embodiments, the amount of the polymer (110) in the matrix part (P2) is controlled, and the light transmittance of the light transmittance control film (1000) may be controlled before applying external force. For example, even though the difference of the refractive index of the copolymer (200) and the refractive index of the dispersed part (P1) in FIG. 3 is greater than about 5%, compatibility of the matrix part (P2) and the dispersed part (P1) increases as the polymer chains (110) are bonded to the copolymer (200), and the size of dispersed particles may decrease, light scattering degree may decrease, and the light transmittance of the light transmittance control film (1000) may increase. If the refractive index of the matrix part (P2) approaches the refractive index of the dispersed part (P1), the light transmittance of the light transmittance control film (1000) may increase.

Figure 4:
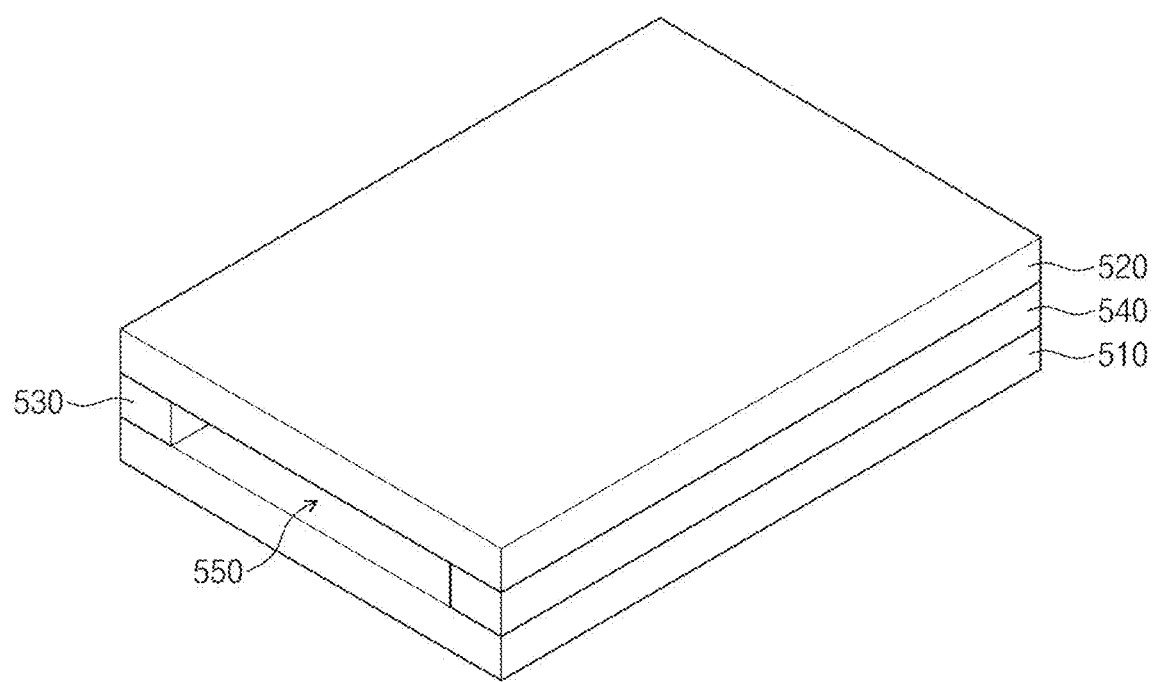
FIG. 4 is a perspective view for explaining a manufacturing process of a light transmittance control film according to embodiments.

FIG. 4 is a perspective view for explaining a manufacturing process of a light transmittance control film according to embodiments. Hereinafter, overlapping parts with the above explanation will be omitted.

Referring to FIG. 4, a first substrate (510), a second substrate (520), a first spacer (530), and a second spacer (540) may be prepared. The second substrate (520) may be separately disposed from the first substrate (510) in a vertical direction. The first substrate (510) and the second substrate (520) may be glass substrates. The first spacer (530) and the second spacer (540) may be disposed between the first substrate (510) and the second substrate (520). The second spacer (540) may be separately disposed from the first spacer (530) in a horizontal direction. The first spacer (530) and the second spacer (540) may include organic materials such as polyimide. A room (550) may be provided between the first substrate (510) and the second substrate (520), and the first spacer (530) and the second spacer (540).

A composition (10 in FIG. 1) for a light transmittance control film may be supplied on the first substrate (510). The room (550) may be filled with the composition (10) for a light transmittance control film. For example, the composition (10) for a light transmitting control film may include a first monomer (100), a copolymer (200), and an initiator (300).

Ultraviolet (UV) light may be supplied onto the second substrate (520). By conducting UV irradiation, homopolymerization of the first monomer (100), and graft polymerization or crosslinking reaction between the first monomer (100) and the copolymer (200) in the composition (10) for a light transmittance control film may be performed. The polymerization reaction of the composition (10) for a light transmittance control film may be the same as explained above. The composition (10) for a light transmittance control film may be UV-cured. Accordingly, the light transmittance control film (1000) explained in FIG. 2 and FIG. 3 may be manufactured.

A method for controlling light transmittance using a light transmittance control film will be explained.

Figure 5:
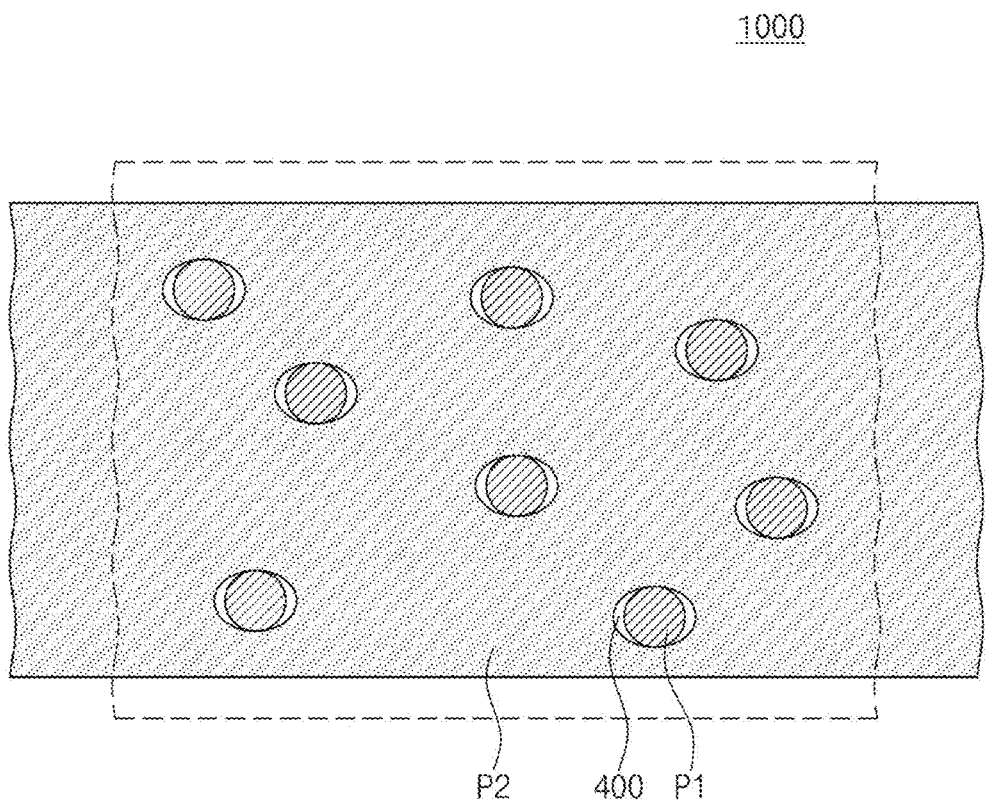
FIG. 5 is a diagram for explaining a method for controlling light transmittance using the light transmittance control film of FIG. 2.

FIG. 5 is a diagram for explaining a method for controlling light transmittance using the light transmittance control film of FIG. 2. Hereinafter, the overlapping part with the above explanation will be omitted.

Referring to FIG. 2, a light transmittance control film (1000) may be a state that external force (for example, tensile force) is not applied. In this case, the light transmittance control film (1000) may be transparent. For example, the transmittance of the light transmittance control film (1000) in a visible region may be from about 35% to about 95%. The visible light may mean light having a wavelength of about 400 nm to about 700 nm. A matrix part (P2) may have compatibility with a dispersed part (P1). Between the dispersed part (P1) and the matrix part (P2), voids may not be provided. In another embodiment, if voids are provided between the dispersed part (P1) and the matrix part (P2), the voids may be very small. The matrix part (P2) may have the same or similar refractive index as the dispersed part (P1). If the refractive index of the matrix part (P2) and the refractive index of the dispersed part (P1) are quite different, or if compatibility between the dispersed part (P1) and the matrix part (P2) is very low, the light transmittance of the light transmittance control film (1000) may decrease. According to exemplary embodiments, the difference between the refractive index of the matrix part (P2) and the refractive index of the dispersed part (P1) may be less than about 5%. If the dispersed part (P1) or the matrix part (P1) shows crystallinity, the light transmittance of the light transmittance control film (1000) may decrease. According to exemplary embodiments, the dispersed part (P1) and the matrix part (P1) may be amorphous.

Referring to FIG. 5, external force may be applied to the light transmittance control film (1000). The external force may be tensile force. The external force may have a certain intensity value or more. The light transmittance of the light transmittance control film (1000) may decrease due to stress-whitening phenomenon when the external force is applied. The matrix part (P2) may have a relatively small initial modulus and may be elongated by the external force. In FIG. 5, a broken line indicates the matrix part (P2) before the application of tensile force. The initial modulus of the matrix part (P2) may be, for example, from about 0.01 MPa to about 1 MPa. The dispersed part (P1) has relatively large initial modulus, and may be much less elongated than the matrix part (P2) when the external force is applied. For example, the initial modulus of the dispersed part (P1) may be about 100 MPa or more, specifically, about 100 MPa to about 100,000 MPa. In another embodiment, the strain of the dispersed part (P1) may be very small when compared to that of the matrix part (P2). Accordingly, voids (400) may be formed between the dispersed part (P1) and the matrix part (P2). In another embodiment, while the tensile force is applied, the voids (400) may have a greater volume than the voids (not shown) while tensile force is not applied. The voids (400) may be a vacuum state, or air may be supplied in the voids (400). The dispersed part (P1) and the matrix part (P2) may have a large difference of refractive index from that of the voids (400). Due to the difference of refractive index, light passing through the elongated film may be scattered or reflected. Accordingly, the light transmittance of the light transmittance control film (1000) may decrease. In an embodiment, the light transmittance control film (1000) may become opaque.

As explained above, the dispersed part (P1) may have particles of about 10 nm to about 500 nm in maximum diameter. If the maximum diameter of particles in the dispersed part (P1) is less than about 10 nm, the volume of voids (400) occurring between the dispersed part (P1) and the matrix part (P2) may decrease. Accordingly, even though tensile force is applied to the light transmittance control film (1000), the light transmittance change of the light transmittance control film (1000) may not be large. For example, the light transmittance control film (1000) may become transparent. In this case, it may be hard to control the light transmittance by the light transmittance control film (1000). If the maximum diameter of particles in the dispersed part (P1) is greater than about 500 nm, the light transmittance control film (1000) may become opaque due to the dispersed particles themselves. Accordingly, even tensile force is applied to the light transmittance control film (1000), the light transmittance change of the light transmittance control film (1000) may not be large. In this case, the control of the light transmittance of the light transmittance control film (1000) may become difficult.

Referring to FIG. 2 again, the external force applied to the light transmittance control film (1000) may be removed. Since the matrix part (P2) has excellent elasticity recovery properties, it may return to the initial state before applying the external force. For example, the initial length of the matrix part (P2) may be recovered without any deformation as explained in FIG. 5. The voids (400) between the dispersed part (P1) and the matrix part (P2) may disappear. Accordingly, the light transmittance control film (1000) may be transparent again. For example, the light transmittance control film (1000) may have transmittance of about 35% to about 95% in a visible region. According to exemplary embodiment, the intensity of light penetrating to the light transmittance control film (1000) may be controlled according to the intensity of external force applied to the light transmittance control film (1000). That is, the stress-whitening phenomenon of the light transmittance control film (1000) is reversibly controlled, and light transmittance may be controlled reversibly. The light transmittance control film (1000) may be simply manufactured by the photo-polymerization reaction of the composition (10) for a light transmittance control film. If the light transmittance control film (1000) is used in a LCD (Liquid Crystal Display) module, a polarized film in the display module may be omitted. In this case, the display module may be miniaturized. If the light transmittance control film (1000) is used as a window, it may be applied to a smart window with which external or inner view is controlled.

Hereinafter, the preparation of a composition and a film will be explained referring to experimental examples of the present invention.

Preparation of Compositions 1-1. Preparation of Copolymer (Experimental Example PDMS 1)

After 70.08 g (473 mmol) of diethoxydimethylsilane and 2.35 g (14.7 mmol) of diethoxymethylvinylsilane (feeding mole ratio=97.0:3.0) were added to a 250 ml of three-necked flask at room temperature (about 25° C.) under nitrogen, 7.6 ml of distilled water and 1.9 ml of hydrochloric acid (37%) were slowly added as polymerization catalysts to the flask. Then, the reaction temperature was elevated to about 70° C. After polymerization reaction was performed for about 24 hours under a nitrogen flow of 70 ml/min, the temperature was decreased to room temperature. The highly viscous copolymer was dissolved in 200 ml of ethyl acetate (EA) for dilution and then the polymer solution in EA was poured into 700 ml of water to remove the catalysts. After the polymer solution layer was separated from the water layer for one day, the remaining water was removed from the polymer solution in EA using magnesium sulfate. After the magnesium sulfate was filtered off and EA was removed by a vacuum evaporator at room temperature, the transparent, colorless, and highly viscous polymer was dried at 35° C. under vacuum for two days for obtaining Experimental Example PDMS 1.

Identification of Experimental Example PDMS 1 (poly (dimethylsiloxane-co-methylvinylsiloxane))

For identification of Experimental Example PDMS 1, gel permeation chromatography (GPC), Fourier transform infrared spectroscopy (IR), and proton nuclear magnetic resonance spectroscopy ($^1$H NMR) were performed, and the yield was calculated.

The gel permeation chromatography was performed by using a Waters 2690 Alliance gel permeation chromatograph equipped with a refractive index detector and tetrahydrofuran (THF) as a mobile phase at a flow rate of 0.6 ml/min. The IR spectroscopy was performed by using a Nicolet 6700 FT-IR spectrometer. The proton nuclear magnetic resonance spectroscopy was performed by using a Bruker 500 MHz NMR spectrometer and chloroform-$d_1$ (CDCl$_3$) was used as a solvent.

Yield: 33.0 g (91%):

GPC (THF, polystyrene standard): $M_n$=105,832: PD=1.61.

IR $\nu_{max}$ (Liquid, NaCl)/cm$^{-1}$: 3055 w (=C—H str., vinyl): 2963 s (C—H str., methyl): 1598 w (C=C str., vinyl): 1411 m (C—H benzene, methyl): 1097 s (Si—O str., siloxane). $^1$H NMR $\delta_H$ (CDCl$_3$, 500 MHZ): 5.92-6.04 (2H, m, vinyl): 5.77-5.82 (H, m, vinyl): 0.07-0.10 (9H, m, methyl)

In order to measure the molecular weight and the molecular weight distribution of Experimental Example PDMS 1, GPC analysis was performed. The number average molecular weight of Experimental Example PDMS 1 was about 10.6×10$^4$ g/mol, and the weight average molecular weight thereof was about 17.1×10$^4$ g/mol. Polydispersivity of PDMS 1 was 1.61.

From the 1H NMR analysis result of Experimental Example PDMS 1, each peak was observed at 0.1 ppm, 5.8 ppm, and 6.0 ppm. The peak around 0.1 ppm corresponds to the hydrogen of Si—$CH_3$, the peak around 5.8 ppm corresponds to the CH hydrogen of —CH—$CH_2$, and the peak around 5.9-6.0 ppm corresponds to $CH_2$ hydrogen of —CH—$CH_2$. If the amount of hydrogen in each environment was quantified considering each integral value of the related peaks, the ratios of a polymerization unit including dimethylsiloxane (m2 in Formula 2A) and a polymerization unit including methylvinylsiloxane (m1 in Formula 2A) in Experimental Example PDMS 1 are about 0.97 and 0.03, respectively. From the result, the molar ratio of the polymerization units of the copolymer of Experimental Example PDMS 1 was nearly equal to the feeding mole ratio of the monomers. From the results, it was found that Experimental Example PDMS 1 included poly(dimethylsiloxane-co-methylvinylsiloxane.

1-2. Preparation of Copolymer (Experimental Example PDMS 2)

A copolymer was prepared by performing the same method as Experimental Example PDMS 1 above. However, 80.01 g (540 mmol) of diethoxydimethylsilane and 5.55 g (34.6 mmol) of diethoxymethylvinylsilane (feeding mole ratio=94.0:6.0) were used as starting materials. 8.9 ml of distilled water and 2.3 ml of hydrochloric acid (37%) were added as polymerization catalysts.

Identification of Experimental Example PDMS 2 (poly(dimethylsiloxane-co-methylvinylsiloxane)

The calculation of yield, gel permeation chromatography (GPC) analysis, Fourier transform infrared spectroscopy spectrum analysis, and proton nuclear magnetic resonance spectroscopy ($^1$H NMR) were performed by the same method as PDMS 2.

Yield: 39.9 g (93%)

GPC (THF, polystyrene standard): Mn=108,379; PD=1.42

IR vmax (Liquid, NaCl)/$cm^{-1}$: 3055 w (=C—H str., vinyl): 2963 s (C—H str., methyl): 1598 w (C=C str., vinyl): 1410 m (C—H benzene, methyl): 1093 s (Si—O str., siloxane). $^1$H NMR $\delta_H$ (CDCl$_3$, 500 MHZ): 5.92-6.04 (2H, m, vinyl): 5.78-5.83 (H, m, vinyl): 0.08-0.11 (9H, m, methyl)

From the GPC analysis result of Experimental Example PDMS 2, the number average molecular weight of Experimental Example PDMS 2 was about 10.8×10$^4$ g/mol, the weight average molecular weight thereof was about 15.4×10$^4$ g/mol, and the polydispersivity thereof was 1.42.

From 1H NMR analysis result of Experimental Example PDMS 2, each peak was observed at 0.1 ppm, 5.8 ppm, and 5.9 ppm to 6.0 ppm. The peak around 0.1 ppm corresponds to the hydrogen of Si—$CH_3$, the peak around 5.8 ppm corresponds to CH hydrogen of —CH=$CH_2$ and the peak around 5.9 ppm to 6.0 ppm corresponds to $CH_2$ hydrogen of —CH=$CH_2$.

From the result, Experimental Example PDMS 2 was found to include poly(dimethylsiloxane-co-methylvinylsiloxane). Considering each integral value of the peaks, the ratios of a polymerization unit including dimethylsiloxane (m2 in Formula 2A) and a polymerization unit including methylvinylsiloxane (m1 in Formula 2A) in Experimental Example PDMS 2 were about 0.94 and 0.06, respectively. From the result, the molar ratio of the polymer units of the copolymer of Experimental Example PDMS 2 was nearly equal to the feeding mole ratio of monomers.

1-3. Preparation of Copolymer (Experimental Example PDMS 3)

A copolymer was prepared by performing the same method as Experimental Example PDMS 1 above. However, 75.01 g (506 mmol) of diethoxydimethylsilane and 11.07 g (69.1 mmol) of diethoxymethylvinylsilane (feeding mole ratio=88:12) were used as starting materials. 8.8 ml of distilled water and 2.3 ml of hydrochloric acid (37%) were added as polymerization catalysts.

Identification of Experimental Example PDMS 3 (poly(dimethylsiloxane-co-methylvinylsiloxane)

The calculation of yield, gel permeation chromatography (GPC), Fourier transform infrared spectroscopy spectrum (IR), and proton nuclear magnetic resonance spectroscopy analysis ($^1$H NMR) were performed for Experimental Example PDMS 3.

Yield: 40.2 g (93%): GPC (THF, polystyrene standard): $M_n$=88,113; PD=1.60.

IR $v_{max}$ (Liquid, NaCl)/$cm^{-1}$: 3055 w (=C—H str., vinyl): 2963 s (C—H str., methyl): 1598 w (C=C str., vinyl): 1409 m (C—H benzene, methyl): 1093 s (Si—O str., siloxane). $^1$H NMR $\delta_H$ (CDCl$_3$, 500 MHz): 5.92-6.04 (2H, m, vinyl): 5.78-5.85 (H, m, vinyl): 0.08-0.11 (9H, m, methyl).

From the analysis result of Experimental Example PDMS 3, the number average molecular weight of Experimental Example PDMS 3 was about 8.8×10$^4$ g/mol, the weight average molecular weight thereof was about 14.1×10$^4$ g/mol, and the polydispersivity thereof was 1.60.

From the result, Experimental Example PDMS 3 was found to include poly(dimethylsiloxane-co-methylvinylsiloxane). Considering each integral value of the peaks, the ratios of a polymerization unit including dimethylsiloxane (m2 in Formula 2A) and a polymerization unit including methylvinylsiloxane (m1 in Formula 2A) in Experimental Example PDMS 3 were about 0.88 and 0.12, respectively. From the result, the molar ratio of the polymer units of the copolymer of Experimental Example PDMS 3 was nearly equal to the feeding mole ratio of monomers.

2-1. Preparation of Composition for Light Transmittance Control Film According to Copolymers Each of the copolymers prepared as explained above and t-butyl acrylate (first monomer) were mixed as in Table 1 below to prepare a composition.

To the composition, a polymerization initiator (photoinitiator) was added. 2,2-dimethoxy-2-phenylacetophenone was used as a polymerization initiator, and about 0.5 mol % of 2,2-dimethoxy-2-phenylacetophenone was added with respect to the equivalent of a vinyl group in a mixture solution.

TABLE 1

| Experimental Example | Mass of PDMS 1 (g) | Mass of PDMS 2 (g) | Mass of PDMS 3 (g) | Weight percent of copolymer in a composition (wt %) | Mass of t-butyl acrylate (g) |
|---|---|---|---|---|---|
| PDMS 1-20 | 0.5716 | — | — | 20 | 2.0796 |
| PDMS 1-30 | 1.0808 | — | — | 30 | 2.5375 |
| PDMS 2-20 | — | 0.7022 | — | 20 | 2.8468 |
| PDMS 2-30 | — | 0.9949 | — | 30 | 2.3370 |
| PDMS 3-20 | — | — | 0.5208 | 20 | 2.0905 |
| PDMS 3-30 | — | — | 0.9878 | 30 | 2.3090 |

Experimental Example PDMS 1, Experimental Example PDMS 2, and Experimental Example PDMS 3, were found to be well miscible with t-butyl acrylate. The polymerization initiator was observed to be dissolved in t-butyl acrylate.

2-2. Preparation of Composition for a Film According to First Monomer

A copolymer and a first monomer were mixed as in Table 2 below to prepare a composition. To the composition, an initiator was added. 2,2-dimethoxy-2-phenylacetophenone was used as an initiator, and about 0.5 mol % of 2,2-dimethoxy-2-phenylacetophenone was added with respect to the equivalent of a vinyl group in a mixture solution.

TABLE 2

| Sample name | PDMS 2 (g) | PDMS 3 (g) | First monomer | Amount of first monomer used (g) |
| --- | --- | --- | --- | --- |
| PDMS-A | — | 0.3611 | Methyl acrylate | 1.4222 |
| PDMS-B | — | 0.3812 | Ethyl acrylate | 1.5497 |
| PDMS-C | — | 0.3273 | Methyl methacrylate | 1.3305 |
| PDMS-D | — | 0.3071 | Vinyl acetate | 1.2435 |
| PDMS-E | — | 0.3021 | Styrene | 1.2016 |
| PDMS-F | — | 0.3457 | Butyl acrylate | 1.3610 |
| PDMS-G | 0.3228 | — | Hexyl acrylate | 1.2968 |
| PDMS-H | 0.3709 | — | Octyl acrylate | 1.4883 |

3. Manufacture of Light Transmittance Control Film

Between a first substrate and a second substrate, a first spacer and a second spacer were separately disposed in a horizontal direction. Glass substrates were used as the first and second substrates. A polyimide adhesive tapes with a thickness of about 100 μm were used as the first spacer and the second spacer. A room was provided between the first glass substrate and the second substrate, and between the first spacer and the second spacer. The composition was introduced into the room using capillary force. Ultraviolet light was irradiated for about 10 minutes by using an ultraviolet lamp under nitrogen to manufacture a UV-cured film. The ultraviolet lamp was a Mercury UVH lamp with about 1 KW. The UV intensity of the lamp applied on the composition layer was measured to be 7.25, 8.85, 0.26, and 0.84 mW/cm$^2$ at 395~445 (UVV), 320~390 (UVA), 280~320 (UVB), and 250~260 (UVC) nm, respectively. Then, the first and second substrates were dipped in distilled water for about 24 hours, and the UV-cured film was removed from the first and second substrates and vacuum dried at room temperature for about 2 hours. Accordingly, a light transmittance control film was obtained.

Experimental Example F 1-20, Experimental Example F 1-30, Experimental Example F 2-20, Experimental Example F 2-30, Experimental Example F 3-20, and Experimental Example F 3-30 are films UV-cured from the compositions of Experimental Example PDMS 1-20, Experimental Example PDMS 1-30, Experimental Example PDMS 2-20, Experimental Example PDMS 2-30, Experimental Example PDMS 3-20, Experimental Example PDMS 3-30, respectively.

Hereinafter, FIG. 6 to FIG. 11c will be explained with reference to FIG. 1, FIG. 2, and FIG. 3.

Figure 6:
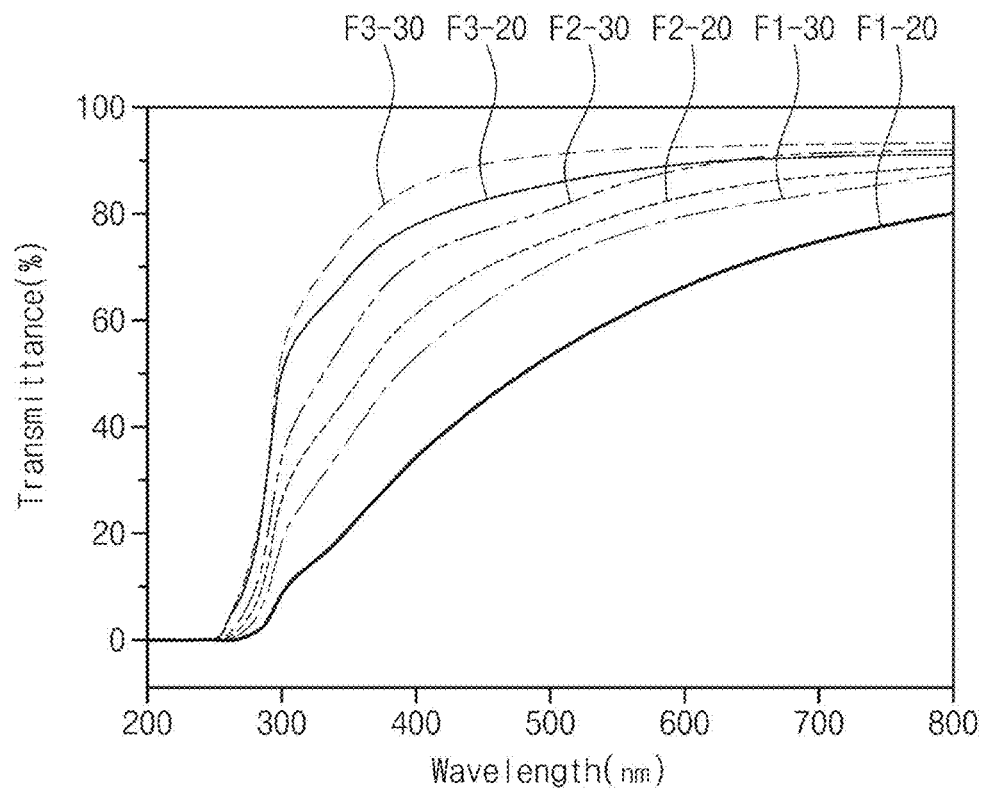
FIG. 6 is a graph showing the light transmittance of Experimental Example F 1-20, Experimental Example F 1-30, Experimental Example F 2-20, Experimental Example F 2-30, Experimental Example F 3-20, and Experimental Example F 3-30 films in accordance with wavelength.

FIG. 6 is a graph showing light transmittance of Experimental Example F 1-20, Experimental Example F 1-30, Experimental Example F 2-20, Experimental Example F 2-30, Experimental Example F 3-20, and Experimental Example F 3-30 films in accordance with wavelength.

Referring to FIG. 6, Experimental Example F 1-20, Experimental Example F 1-30, Experimental Example F 2-20, Experimental Example F 2-30, Experimental Example F 3-20, and Experimental Example F 3-30 films were found to have high light transmittance in a visible region. With increasing the molar ratio of the first polymer, the light transmittance of the light transmittance control film (1000) was increased.

Referring to FIG. 6, if the molar ratio of the first polymer in the composition (10) for a light transmittance control film increases, the first monomer (100) may be reacted to the first polymer during a polymerization reaction process. In the polymerization reaction process, the polymerization between the first monomer (100) may be relatively decreased. Accordingly, the compatibility of the matrix part (P2) with the dispersed part (P1) may increase. The homopolymer from the first monomer (100) may be composed of the dispersed part (P1) in the light transmittance control film (1000). Due to the increase of the compatibility of the matrix part (P2) with the dispersed part (P1), the diameter of the dispersed part (P1) may decrease. If the diameter of the dispersed part (P1) decreases, the light transmittance of the light transmittance control film (1000) may increase. If the weight percent of the first monomer (100) in the composition (10) for a light transmittance control film increases, the polymerization between the first monomer (100) during the polymerization reaction process may be relatively increased. Accordingly, the compatibility of the matrix part (P2) with the dispersed part (P1) may decrease. The homopolymer from the first monomer (100) may be composed of the dispersed part (P1) of the light transmittance control film (1000). Due to the decrease of the compatibility of the matrix part (P2) with the dispersed part (P1), the diameter of the dispersed part (P1) may increase. If the diameter of the dispersed part (P1) increases, the light transmittance of the light transmittance control film (1000) may decrease.

Figure 7A:
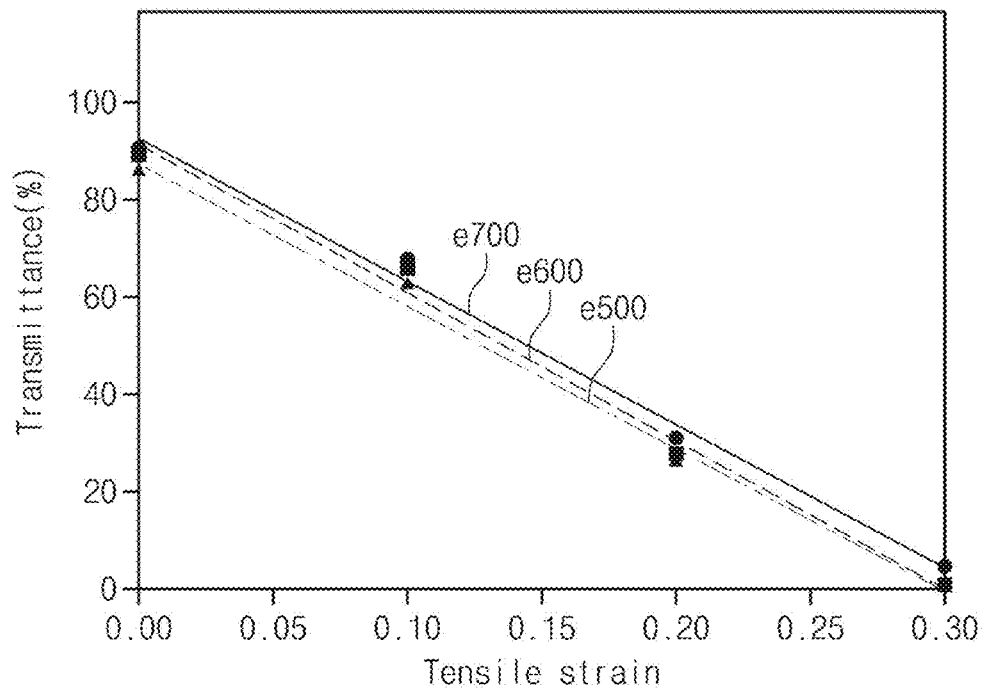
FIG. 7a is a result showing the light transmittance of Experimental Example F 3-20 film in accordance with tensile strain.

FIG. 7a is a result showing light transmittance Experimental Example F 3-20 film in accordance with tensile strain. e500, e600, and e700 are the transmittance variation of Experimental Example F 3-20 film at a wavelength of about 500 nm, about 600 nm, and about 700 nm, respectively. Table 3 shows the coefficient of determination ($r^2$) calculated from the transmittance variation of e500, e600, and e700 in FIG. 7a.

Referring to FIG. 7a, with increasing tensile strain, the light transmittance of the light transmittance control film (1000) in a visible region may decrease. Referring to Table 3, the coefficient of determination calculated from the transmittance variation of the light transmittance control film (1000) in accordance with tensile strain may approach 1. From this, it may be found that the light transmittance of the light transmittance control film (1000) linearly decreased in accordance with the tensile strain. According to exemplary embodiments, the light transmittance of the light transmittance control film (1000) may be controlled by controlling the intensity of tensile force applied to the light transmittance control film (1000) within the elastic region of the light transmittance control film (1000).

TABLE 3

|  | e500 | e600 | e700 |
| --- | --- | --- | --- |
| Wavelength of light (nm) | 500 nm | 600 nm | 700 nm |
| Coefficient of determination | 0.9932 | 0.9921 | 0.9924 |

Figure 7B:
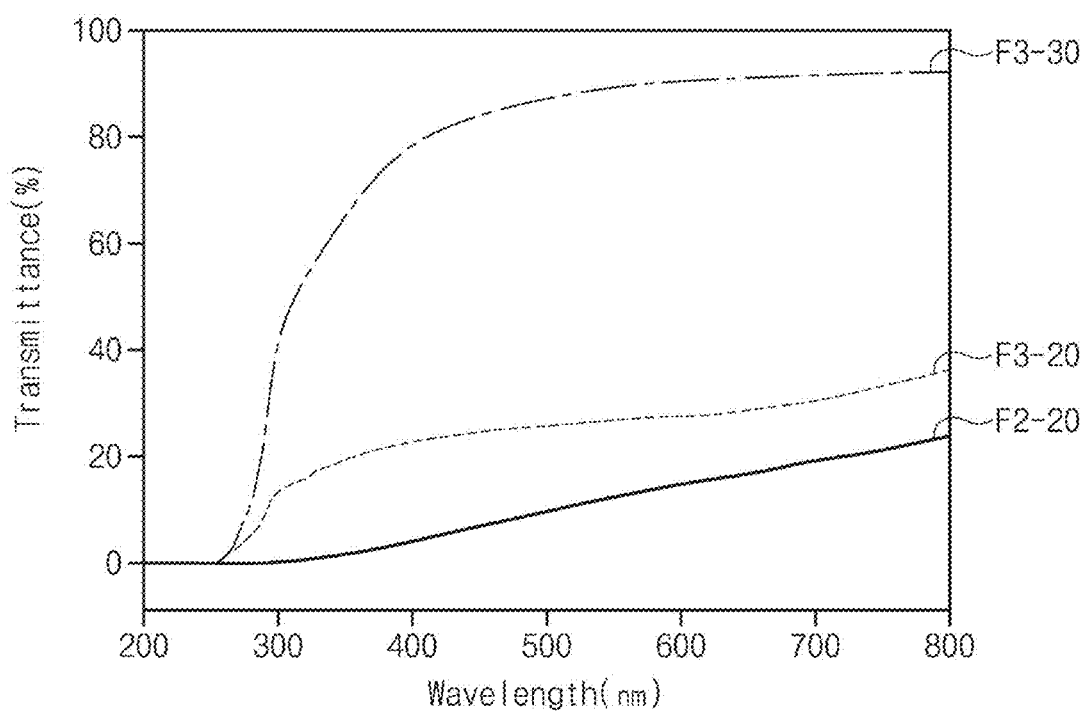
FIG. 7b is an analysis result of the light transmittance of Experimental Example F 2-20, Experimental Example F 3-20, and Experimental Example F 3-30 films in accordance with wavelength while a tensile strain of 0.2 is applied to the light transmittance control films.

FIG. 7b is an analysis result of the light transmittance of Experimental Example F 2-20, Experimental Example F 3-20, and Experimental Example F 3-30 films in accordance with the wavelength of light while tensile strain is applied to a light transmittance control film. In this case, a tensile strain of about 0.2 was applied.

Referring to FIG. 7b with FIG. 5, under the same wavelength and the same tensile strain conditions, light transmittance of Experimental Example F 3-30, Experimental Example F 3-20, and Experimental Example F 2-20 films were increased in this order. As explained Table 4, the sizes of the dispersed part (P1) in the light transmittance control film (1000) of Experimental Example F 2-20, Experimental Example F 3-20, and Experimental Example F 3-30 films may increase in this order. If the applied tensile force is constant, the volumes of voids (400) formed between the dispersed part (P1) and the matrix part (P2) may increase with increasing the sizes of the dispersed part (P1). The light transmittance change efficiency of the light transmittance control film (1000) may increase with increasing the diameters of the dispersed part (P1). According to exemplary embodiments, when tensile force is applied to the light transmittance control film (1000), the light transmittance change efficiency of the light transmittance control film may be controlled by controlling the molar ratio of the first polymer or the weight percent of the first monomer (100) in the composition (10 in FIG. 1) for a light transmittance control film.

Figure 8A:
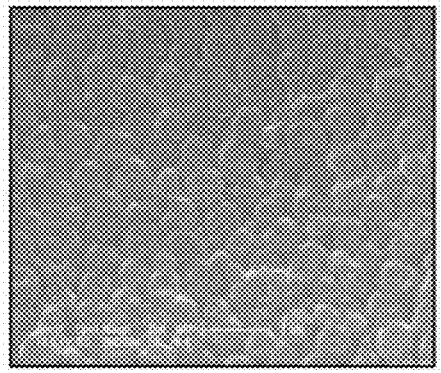
FIG. 8a is a scanning electron microscope (SEM) plain image of Experimental Example F 2-20 film while a tensile strain of 0.2 is applied to a light transmittance control film.
Figure 8B:
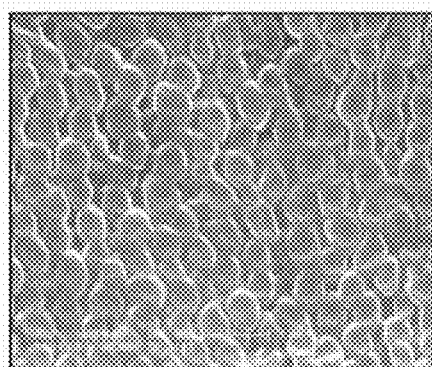
FIG. 8b is a SEM plain image of Experimental Example F 2-20 film while a tensile strain of 0.4 is applied to a light transmittance control film.
Figure 8C:
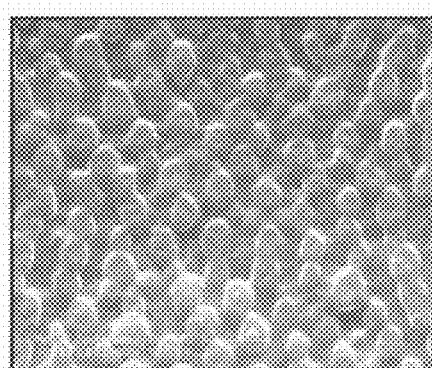
FIG. 8c is a SEM plain image of Experimental Example F 2-20 film while a tensile strain of 0.8 is applied to a light transmittance control film.

FIG. 8a is a scanning electron microscope (SEM) plain image of Experimental Example F 2-20 film while a tensile strain of 0.2 is applied to a light transmittance control film. FIG. 8b is a SEM image of Experimental Example F 2-20 film while a tensile strain of 0.4 is applied to a light transmittance control film. FIG. 8c is a SEM image of Experimental Example F 2-20 film while a tensile strain of 0.8 is applied to a light transmittance control film. Table 4 shows the results of Experimental Example F 2-20 film observed from the SEM images while a tensile strain of 0.2, 0.4, or 0.8 was applied to the light transmittance control film.

TABLE 4

| Applied tensile strain | 0.2 | 0.4 | 0.8 |
|---|---|---|---|
| Volume change of dispersed part (P1) | X | X | X |
| Observed results of voids formed between dispersed part (P1) and matrix part (P2) | Voids are formed | Voids thus formed have large volume | Voids thus formed have very large volume. |

Referring to FIG. 8a, FIG. 8b, FIG. 8c, and Table 4 along with FIG. 5, it was found that the volume of the voids (400) formed between the dispersed part (P1) and the matrix part (P2) increased with increasing applied tensile strain. In this case, the volume change of the dispersed part (P1) was rarely shown even though tensile force was applied. This result may be because the initial elastic coefficient of the dispersed part (P1) was large. The initial modulus of poly (t-butyl acrylate) which was the practically dispersed part (P1), was measured at about 1.14 GPa, which was greater 1000 times or more than that of a crosslinked PDMS (matrix part (P2)) which had generally about 1 MPa or less. The UV-cured film fabricated from the composition of Example 2-2 did not show stress-whitening phenomenon according to the elongation by tensile force. This is because the initial modulus of the homopolymer of which the dispersed part (P1) is composed is low and about 100 MPa or less. If the initial modulus difference between the dispersed part (P1) and the matrix part (P2) decreases, voids may not be formed between the dispersed part (P1) and the matrix part (P2), which does not show stress-whitening phenomenon. According to exemplary embodiments, the transmittance of the light transmittance control film (1000) may decrease due to the stress-whitening phenomenon of the light transmittance control film (1000). For example, the light transmittance of the light transmittance control film (1000) may be controlled by controlling the intensity of tensile strain which is applied to the light transmittance control film (1000).

Table 5 shows measured results of the initial modulus, the maximum tensile strength, the yield tensile strain, and the maximum tensile strain of Experimental Example F 1-20, Experimental Example F 1-30, Experimental Example F 2-20, Experimental Example F 2-30, Experimental Example F 3-20, and Experimental Example F 3-30 films. In Table 5, s.d. in parenthesis means a standard deviation. The initial modulus, the maximum tensile strength, the yield tensile strain, and the maximum tensile strain of the experimental examples were measured by using TA Instrument RSA-G2.

TABLE 5

| Experimental Example | Initial modulus (MPa) (s.d.) | Maximum tensile strength (MPa) (s.d.) | Yield tensile strain (s.d.) | Maximum tensile strain (s.d.) |
|---|---|---|---|---|
| F 1-20 | 15.67 (1.60) | 3.49 (0.16) | 0.10 (0.01) | 1.02 (0.09) |
| F 1-30 | 2.31 (0.32) | 3.04 (0.23) | 0.22 (0.02) | 2.23 (0.24) |
| F 2-20 | 16.70 (2.28) | 9.03 (0.53) | 0.17 (0.006) | 1.29 (0.14) |
| F 2-30 | 6.47 (1.74) | 7.75 (0.82) | 0.26 (0.05) | 2.60 (0.17) |
| F 3-20 | 34.24 (5.18) | 12.95 (1.82) | 0.17 (0.02) | 1.06 (0.20) |
| F 3-30 | 9.24 (0.68) | 10.29 (0.27) | 0.47 (0.07) | 2.04 (0.15) |

Referring to Table 5, if the weight percent of the copolymer in the composition (10) for a light transmittance control film increases, the initial modulus decreases, and the yield tensile strain and the maximum tensile strain increase. If the molar ratio of the first polymer in the copolymer increases, the maximum tensile strength of the light transmittance control film (1000) may increase. The maximum tensile strength of the light transmittance control film (1000) may increase with increasing the amount of the reactive group in the copolymer.

The first polymer may have a reactive group. If the amount of the reactive group in the copolymer increases, in other words, if the molar ratio of the first polymer in the copolymer increases, the amount and size of the dispersed part (P1) in the light transmittance control film (1000) thus manufactured may decrease, and the amount of the grafted polymer (110) with respect to the matrix part (P2) may increase. According to the amount of the dispersed part (P1) and the grafted polymer (110), the physical properties of the light transmittance control film (1000) may be changed. According to exemplary embodiments, by controlling the molar ratio of the first polymer in the composition (10) for a light transmittance control film, the initial modulus, the maximum tensile strength, the yield tensile strain, and the maximum tensile strain of the light transmittance control film (1000) may be controlled.

Figure 9:
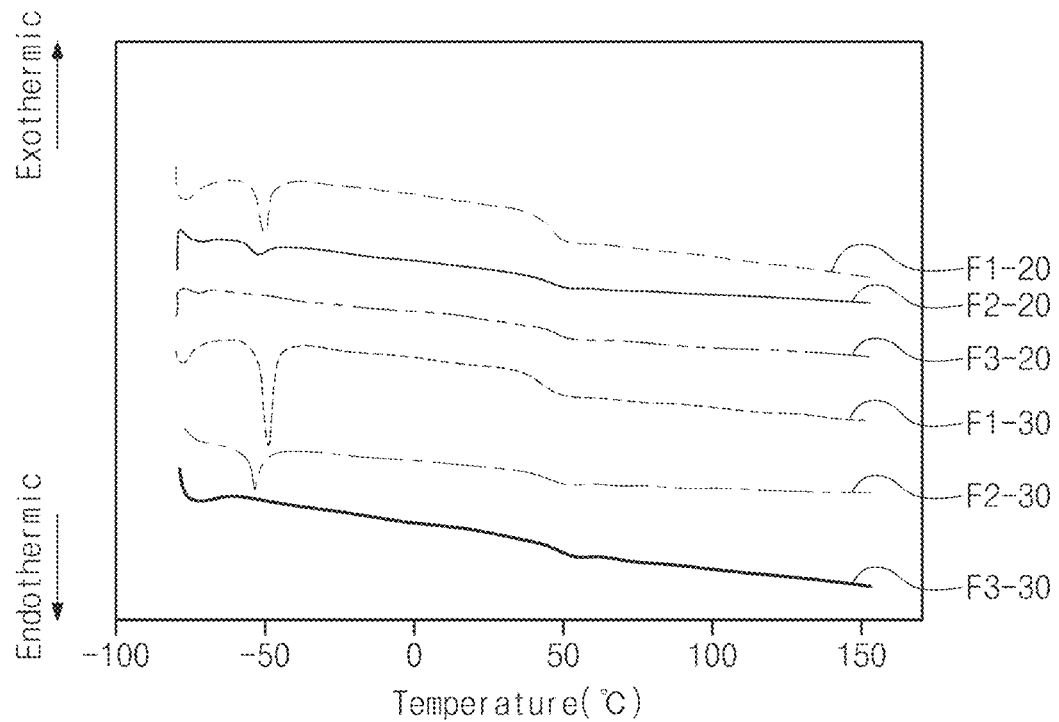
FIG. 9 is a graph showing analysis results of differential scanning calorimetry (DSC) of Experimental Example F 1-20, Experimental Example F 1-30, Experimental Example F 2-20, Experimental Example F 2-30, Experimental Example F 3-20, and Experimental Example F 3-30 films.

FIG. 9 is a graph showing analysis results of differential scanning calorimetry of Experimental Example F 1-20, Experimental Example F 1-30, Experimental Example F 2-20, Experimental Example F 2-30, Experimental Example F 3-20, and Experimental Example F 3-30 films. In FIG. 9, the axis of abscissa represents the temperature, and the axis of ordinate relatively represents heat flow of the reaction. The differential scanning calorimetry analysis was performed under a nitrogen flow of about 50 ml/min in a temperature range of about −100° C. to about 150° C. at a heating rate of 10° C./min by using a TA Instruments DSC Q20.

Referring to FIG. 9, peaks were observed between about 45° C. and about 50° C. in Experimental Example F 1-20, Experimental Example F 1-30, Experimental Example F 2-20, Experimental Example F 2-30, Experimental Example F 3-20, and Experimental Example F 3-30 films. The glass transition temperature of the grafted polymer chain (110) and the dispersed part (P1) (poly(t-butyl acrylate)) may be in this temperature region. Peaks in a region from about −55° C. and about −50° ° C. were also observed in Experimental Example F 1-20, Experimental Example F 1-30, Experimental Example F 2-20, and Experimental Example F 2-30. The melting temperature of the matrix part (P2) is in this temperature region. With increasing the amount of the dispersed part (P1) or the amount of the first polymer in the light transmittance control film (1000), the heat of fusion of the light transmittance control film (1000) was found to decrease. In Experimental Example 3-20 and Experimental Example 3-30 films, no peaks corresponding to the melting point of the matrix part (P2) were observed at about −100° C. or more. It was found that Experimental Example F 1-20, Experimental Example F 1-30, Experimental Example F 2-20, Experimental Example F 2-30, Experimental Example F 3-20, and Experimental Example F 3-30 films were amorphous at room temperature (about 25° C.).

FIG. 10a, FIG. 10b, FIG. 10c, and FIG. 10d are transmission electron microscope (TEM) cross-sectional images of Experimental Example F 1-20, Experimental Example F 2-20, Experimental Example F 3-20, and Experimental Example F 3-30 films. JEM-ARM200F Cs-corrected scanning transmission electron microscope was used for the TEM measurement.

Figure 10A:
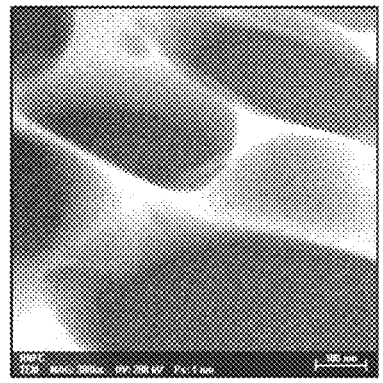
FIG. 10a, FIG. 10b, FIG. 10c, and FIG. 10d are transmission electron microscope (TEM) cross-sectional images of Experimental Example F 1-20, Experimental Example F 2-20, Experimental Example F 3-20, and Experimental Example F 3-30 films.
Figure 10B:
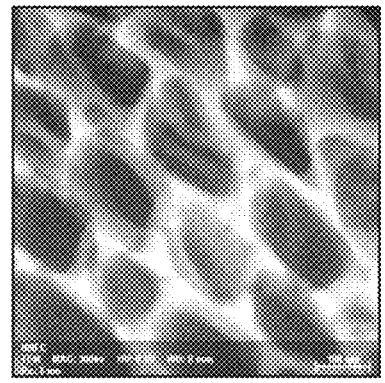
Figure 10C:
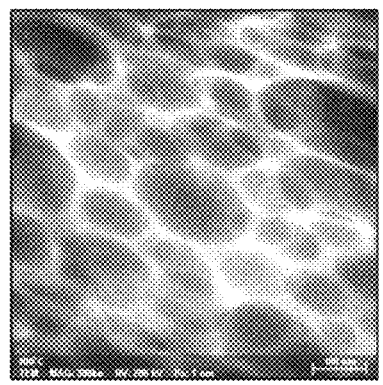
Figure 10D:
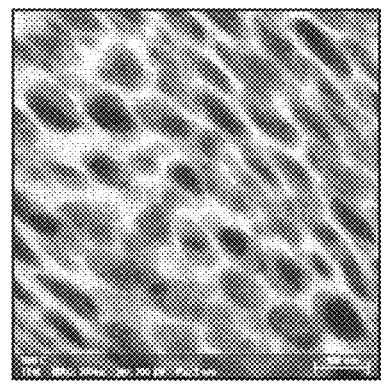

Referring to FIG. 10a, FIG. 10b, FIG. 10c, and FIG. 10d, dispersed part (P1) are densely distributed in a matrix part (P2). Referring to FIG. 10a, an average size of the dispersed part (P1) in a long axis direction was found to be about 300-500 nm or more. An average size of the dispersed part (P1) in a short axis direction was about 200 nm or more. Referring to FIG. 10b, an average size of the dispersed part (P1) in a long axis direction was observed to be about 200 nm. An average size of the dispersed part (P1) in a short axis direction was about 100 nm. Referring to FIG. 10c, an average size of the dispersed part (P1) in a long axis direction was observed to be about 100 nm to about 150 nm. A size of the dispersed part (P1) in a short axis direction was about 50 nm to about 100 nm. Referring to FIG. 10d, an average size of the dispersed part (P1) in a long axis direction was observed to be about 100 nm. An average size of the dispersed part (P1) in a short axis direction was about 50 nm or less.

The vinyl group of the first polymer of the copolymer (200) in the composition (10) for a light transmittance control film may act as a reactive group. The molar ratio of the first monomer (for example, t-butyl acrylate) to the reactive group in the copolymer (200) used for the preparation of Experimental Example F 1-20, Experimental Example F 2-20, Experimental Example F 3-20, and Experimental Example F 3-30 films were calculated as 83.0:1, 42.4:1, 20.5:1, and 12.0:1, respectively. If the amount of the reactive group increases, the amount ratio of a grafted polymer (110) (for example, grafted poly(t-butyl acrylate)) in the light transmittance control film (1000) may increase. Since the grafted polymer chain (110) acts as a compatibilizing agent between the matrix part (P2) and the dispersed part (P1), the size of the dispersed part (P1) may decrease. The dispersed part (P1) may have an elliptical shape.

Figure 11A:
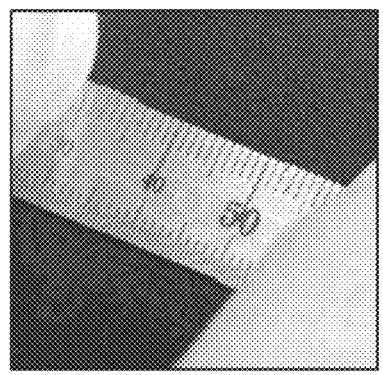
FIG. 11a is a photo-image of Experimental Example F 3-20 film while tensile force is not applied.
Figure 11B:
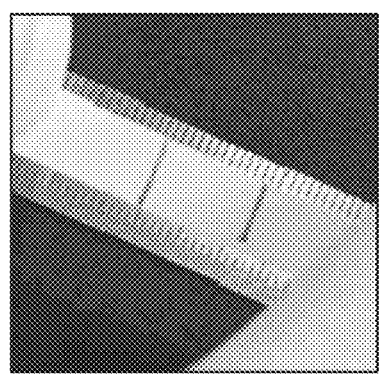
FIG. 11b is a photo-image of Experimental Example F 3-20 film during applying tensile force.
Figure 11C:
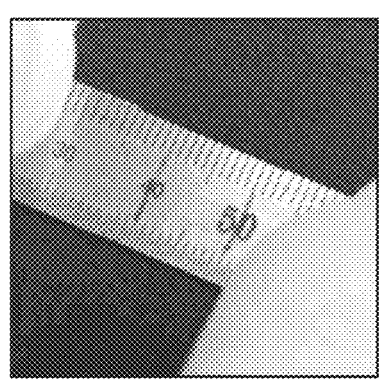
FIG. 11c is a photo-image of Experimental Example F 3-20 film when tensile force is removed after applying the tensile force.

FIG. 11a is a photo-image of Experimental Example F 3-20 film while tensile force is not applied. FIG. 11b is a photo-image of Experimental Example F 3-20 film during applying tensile force. FIG. 11c is a photo-image of Experimental Example F 3-20 film when tensile force is removed after the application of the tensile force.

Referring to FIG. 11a, a light transmittance control film (1000) while tensile force is not applied, may be transparent.

Referring to FIG. 11b, if tensile force is applied, the light transmittance of the light transmittance control film (1000) may decrease. That is because stress-whitening phenomenon occurs as tensile force is applied to the light transmittance control film (1000). As explained previously referring to FIG. 5 and Table 4, voids (400) may be formed between the dispersed part (P1) and the matrix part (P2), and the voids (400) may be under vacuum or air may be supplied into the voids (400). The dispersed part (P1) and the matrix part (P2) may have a great difference of refractive index from vacuum or air. Due to the difference of the refractive index, visible light may be scattered or reflected. Accordingly, the light transmittance of the light transmittance control film (1000) may decrease. For example, the light transmittance control film (1000) may become opaque. That is, the background under the light transmittance control film (1000) was not seen. Based on the lines drawn in the figures, tensile strain was about 0.15-0.2.

Referring to FIG. 11c, if tensile force is removed, the light transmittance of the light transmittance control film (1000) may increase again. That is because the copolymer (200) has excellent elasticity recovery properties, and the matrix part (P2) returns to substantially the initial state as that before applying the external force. For example, the light transmittance control film (1000) may become transparent. The background under the light transmittance control film (1000) was observed again.

The above-disclosed detailed description of the present invention is not intended to limit the present invention to disclosed exemplary embodiments, but may be used in various combinations, changes and environments only if within the gist of the present invention. Attached claims should be interpreted to include other embodiments.

The invention claimed is:

1. A composition for a light transmittance control film, comprising:
    a first monomer comprising an acryl-based monomer or a vinyl-based monomer; and
    a copolymer comprising a first polymer unit derived from a second monomer and a second polymer unit derived from a third monomer,
    wherein a molar ratio of the first polymer unit in the copolymer and a total amount of the first monomer is from about 1:5 to about 1:100, and
    wherein the copolymer comprises a silicon copolymer represented by the following Formula 4B,
    wherein the silicon copolymer has a weight average molecular weight of about 5,000 to about 500,000, and
    wherein the silicon copolymer is completely dissolved in the first monomer:

[Formula 4B]

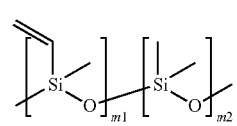

in Formula 4B, a ratio of m1 and m2 is from about 1:4 to about 1:200.

2. The composition for a light transmittance control film of claim 1, wherein the first monomer is represented by the following Formula 1:

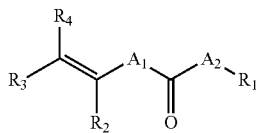

[Formula 1]

in Formula 1, A1 and A2 are each independently a single bond, oxygen (O), —NH—, or sulfur (S), R1 is hydrogen, halogen, linear or branched alkyl group of 1 to 8 carbon atoms, or halogen-substituted linear or branched alkyl group of 1 to 8 carbon atoms, and R2, R3, and R4 are each independently hydrogen, halogen, or linear or branched alkyl group of 1 to 5 carbon atoms.

3. The composition for a light transmittance control film of claim 1, wherein the first polymer unit is represented by the following Formula 2A:

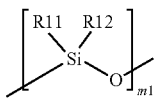

[Formula 2A]

in Formula 2A, R11 is represented by the following Formula 2B, R12 is hydrogen, halogen, linear or branched alkyl group of 1 to 5 carbon atoms, or substituted or unsubstituted phenyl group of 6 to 13 carbon atoms, and m1 is an integer between 2 and 50:

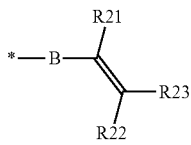

[Formula 2B]

in Formula 2B, B is a single bond, or linear or branched alkyl group of 1 to 5 carbon atoms, carbonyl, ester, acetate, amide, or —S—CO— group, and R21, R22, and R23 are each independently hydrogen, halogen, or linear or branched alkyl group of 1 to 5 carbon atoms.

4. The composition for a light transmittance control film of claim 3, wherein the second polymer unit is represented by the following Formula 3:

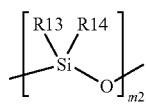

[Formula 3]

in Formula 3, R13 and R14 are each independently hydrogen, halogen, linear or branched alkyl group of 1 to 5 carbon atoms, or substituted or unsubstituted phenyl group of 6 to 13 carbon atoms, and m2 is an integer between 10 and 10,000.

5. The composition for a light transmittance control film of claim 1, wherein the first monomer comprises a t-butyl acrylate.

6. The composition for a light transmittance control film of claim 5, wherein a molar ratio of the t-butyl acrylate monomer with respect to a total molar ratio of a vinyl group included in the copolymer is from about 1:5 to about 1:100.

7. The composition for a light transmittance control film of claim 1, further comprising a photoinitiator.

8. The composition for a light transmittance control film of claim 7, wherein at least one of the first monomer and the copolymer comprises a vinyl group, and the photoinitiator is about 0.05-5 mol % based on the total of the vinyl group.

9. The composition for a light transmittance control film of claim 1, wherein the copolymer is represented by the following Formula 6A:

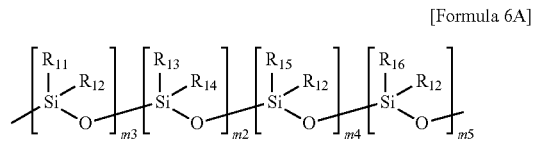

[Formula 6A]

in Formula 6A, m2 is an integer between 10 and 10,000, the sum of m3, m4, and m5 is an integer between 2 and 50, R11 is represented by the following Formula 2B, R12, R13, and R14 are each independently hydrogen, halogen, linear or branched alkyl group of 1 to 5 carbon atoms, or substituted or unsubstituted phenyl group of 6 to 13 carbon atoms, R15 is represented by the following Formula 6B, and R16 is represented by the following Formula 6C:

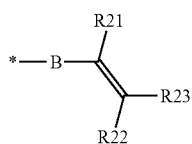

[Formula 2B]

in Formula 2B, * means a bonded part of Formula 6A to Si, B is a single bond, or linear or branched alkyl group of 1 to 5 carbon atoms, carbonyl, ester, acetate, amide, or —S—CO— group, and R21, R22, and R23 are each independently hydrogen, halogen, or linear or branched alkyl group of 1 to 5 carbon atoms:

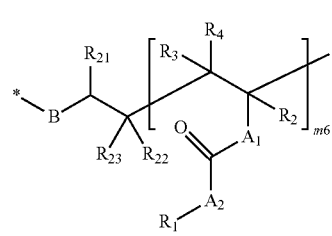

[Formula 6B]

in Formula 6B, * means a part bonded to Si in Formula 6A, A1 and A2 are each independently a single bond, oxygen (O), —NH—, or sulfur (S), B is a single bond, linear or branched alkyl group of 1 to 5 carbon atoms, carbonyl, ester, acetate, amide, or —S—CO— group, R1 is hydrogen, halogen, linear or branched alkyl group of 1 to 8 carbon atoms, or halogen-substituted linear or branched alkyl group of 1 to 8 carbon atoms, R2, R3, and R4 are each independently hydrogen, halogen, or linear or branched alkyl group of 1 to 5 carbon atoms, R21, R22, and R23 are each independently hydrogen, halogen, linear or branched alkyl group of 1 to 5 carbon atoms, or substituted or unsubstituted phenyl group of 6 to 13 carbon atoms, and m6 is an integer selected from 1 to 100:

[Formula 6C]

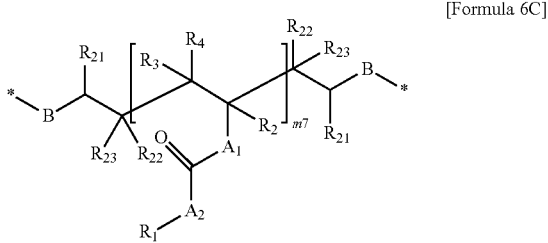

in Formula 6C, * means a part bonded to Si in Formula 6A, A1 and A2 are each independently a single bond, oxygen (O), —NH—, or sulfur (S), B is a single bond, linear or branched alkyl group of 1 to 5 carbon atoms, carbonyl, ester, acetate, amide, or —S—CO— group, R1 is hydrogen, halogen, linear or branched alkyl group of 1 to 8 carbon atoms, or halogen-substituted linear or branched alkyl group of 1 to 8 carbon atoms, R2, R3, and R4 are each independently hydrogen, halogen, or linear or branched alkyl group of 1 to 5 carbon atoms, R21, R22, and R23 are each independently hydrogen, halogen, linear or branched alkyl group of 1 to 5 carbon atoms, or substituted or unsubstituted phenyl group of 6 to 13 carbon atoms, and m7 is an integer selected from 1 to 100.

10. The composition for a light transmittance control film of claim 1, wherein the composition for a light transmittance control film does not include water.

11. The composition for a light transmittance control film of claim 1, wherein the first monomer comprises at least one selected from styrene, 2,3,4,5,6-pentafluorostyrene, methylacrylate, methylmethacrylate, ethylacrylate, ethylmethacrylate, butylacrylate, butylmethacrylate, t-butylacrylate, t-butylmethacrylate, hexylacrylate, hexylmethacrylate, octylacrylate, octylmethacrylate, octadecylacrylate, octadecylmethacrylate, dodecylacrylate, dodecylmethacrylate, vinyl acetate, trifluoroacetic acid allyl ester, trifluoroacetic acid vinyl ester, 2,2,2-trifluoroethyl methacrylate, acrylic acid 1,1,1,3,3,3-hexafluoroisopropyl ester, methacrylic acid 1,1,1,3,3,3-hexafluoroisopropyl ester, and 1-pentafluorophenylpyrrole-2,5-dione.

* * * * *